United States Patent [19]
Aggarwal et al.

[11] Patent Number: 6,154,463
[45] Date of Patent: Nov. 28, 2000

[54] SYSTEM AND METHOD FOR MULTICAST CONFERENCING AND ONLINE DISCUSSION GROUPS

[75] Inventors: Sudhir Aggarwal, Long Branch; Sanjoy Paul, Marlboro, both of N.J.

[73] Assignee: Lucent Technologies, Inc., Murray Hill, N.J.

[21] Appl. No.: 08/917,344

[22] Filed: Aug. 26, 1997

[51] Int. Cl.$^7$ .................................................. H04L 12/28
[52] U.S. Cl. ............................................................ 370/408
[58] Field of Search ...................................... 370/238, 235, 370/256, 396, 408

[56] References Cited

U.S. PATENT DOCUMENTS 5,291,477  3/1994  Liew ........................................ 370/238

OTHER PUBLICATIONS

"Dualcast: A Scheme for Reliable Multicasting" by S. Aggarwal et al., IEEE Computer Society Press; Apr. 1994, pp. 15–22; Proceedings 1994 Int'l Conference on Network Protocols, Oct. 25–28, 1994, Boston Massachusetts.

"Steiner's Problem in Graphs & Its Implications" by L. Hakimi; Networks, 1: pp. 113–133, published 1971 by John Wiley & Sons, Inc.

"Multicast Routing for Multimedia Communication" by Kompella et al., IEEE/ACM Transactions on Networking, vol. 1, No. 3, Jun. 1993; pp. 286–292.

"Core Based Trees (CBT); An Architecture for Scalable Inter–Domain Multicast Routing" by Tony Ballardie et al.; ACM SIGCOMM '93 Conference Proceedings, Communications Architectures, Protocols & Applications, vol. 23, No. 4, Oct. 1993; pp. 85–95.

"How Bad is Naive Multicast Routing?" by Matthew Doar et al., IEEE Infocom '93 Proceedings vol. 1, 12th Annual Joint Conference of the IEEE Computer & Communications Societies, San Francisco, CA; 82–89.

"Routing of Multipoint Connections" by Bernard M. Waxman; IEEE Journal on Selected Areas In Communications, vol. 6, No. 9, Dec. 1988; pp. 1617–1622.

"Distance Vector Multicast Routing Protocol" by D. Waitzman et al.; Nov. 1988; Networking Working Group: Request for Comments: RFC 1075; http://info.internet.isi.edu:80/in–notes/rfc/files/rfc1075.

"Host Extensions for IP Multicasting"by S. Deering; Aug. 1989; Network Working Group Request for Comments: 1112; Obsoletes: RFCs 988, 1054 http://info.internet.isi.edu:80/in–notes/rfc/files/rfc1112.

"The Tradeoffs of Multicast Trees & Algorithms" by Liming Wei et al.; to appear in Proc. of 1994 Int'l Conf. on Computer Communications & Networks; Technical Rept.; Sep. 1993.

"An Approximate Solution for the Steiner Problem in Graphs" by H. Takahashi et al.; Math. Japonica 24, No. 6, (1980) pp. 573–577.

"Comparison of Multicast Routing Algorithms for High–Speed Networks" by H. F. Salama et al., IBM Technical Report, Sep. 1994; TR–29.1930 (94A004206).

"Mechanisms for Broadcast & Selective Broadcast"; Ph.D. Thesis, Jun. 1980; by D. W. Wall for Stanford University (87 pgs.).

"Multicast Routing in Datagram Internetworks and Extended LANs" by S. E. Deering & D. R. Cheriton; ACM Transactions ion computer Systems, vol. 8, No. 2, May 1990, pp. 85–110.

(List continued on next page.)

*Primary Examiner*—Chau Nguyen
*Assistant Examiner*—Chiho Andrew Lee
*Attorney, Agent, or Firm*—Morgan & Finnegan, LLP

[57] ABSTRACT

A system and method for multicast conferencing and online discussion groups using a periodically determined a close-to-optimal Steiner spanning tree. Both the system and method are suitable for stationary and/or mobile group members.

38 Claims, 17 Drawing Sheets

OTHER PUBLICATIONS

"Multicast Routing Extensions for OSOPF" by John Moy, Communications of the ACM, Aug. 1994, vol. 37, No. 8, pp. 61–66.

"MBONE: The Multicast Backbone" by Hans Eriksson; Communications of the ACM, Aug. 1994, vol. 37, No. 8, pp. 54–60.

"An Architecture for Wide–Area Multicast Routing" by S. Deering et al..Computer Communication Review; ACM SIGCOM '94 Proc. of Conf. on Communications Architectures, Protocols & Applications, Aug.31–Sep. 2, 1994, London, UK; vol. 24, No. 4, Oct. 1994; pp. 126–135.

"Multicasting for Multimedia Applications" by V. Kompella et al.; Proc. of IEEE Infocom; 1992; pp. 2078–2085.

"Reducibility Among Combinatorial Problems" by Richard M. Karp; Complexity of Computer Computations: Proc. of Sym. held Mar. 20–22, 1972, at IBM TJ Watson Research Center; published by Plenum Press, 1972; pp. 85–103.

"The Computation of Nearly Minimal Steiner Trees in Graphs" by V. J. Rayward–Smith International Journal of Mathematical Education in Science & Technology, 193, vol. 14, No. 1, pp. 15–23.

SYSTEM AND METHOD FOR MULTICAST CONFERENCING AND ONLINE DISCUSSION GROUPS

BACKGROUND OF THE INVENTION

1. Field of the Invention

The present invention relates to the field of telecommunications. More particularly, the present invention relates to a system and a method for multicast conferencing and online discussion groups.

2. Description of the Related Art

Recently, there is an increasing interest in designing and implementing multicast routing protocols suitable for conferencing or online chat/discussion groups. For example, see S. Deering, Host extensions for IP multicasting, RFC 1112, May, 1988; D. Waitzman et al., Distance vector multicast routing protocol, RFC 1075, 1988; B. M. Waxman, Routing of multipoint connections, IEEE Journal on Selected Areas in Communications, Vol. 6–9, pp. 1617–1622, December 1988, S. Deering et al., Multicast routing in datagram internetworks and extended LANs, ACM Transactions on Computer Systems, pp. 85–111, May 1990; M. Doar et al., How bad is naive multicasting, Proceedings of the IEEE INFOCOM, pp. 82–89, 1993; and J. Moy, Multicast routing extensions for OSPF, Comm. of the ACM, Vol. 37–8, pp. 61–66, August 1994, each of which is incorporated by reference herein.

An important step m the development of multicast routing protocols has been the deployment of a multicast version of the distance vector routing protocol (DVMRP) over the Multicast Backbone (MBone). For example, see D. Waitzman et al., supra; and H. Eriksson, Mbone: the multicast backbone, Comm. of the ACM, pp. 54–60, August 1994, which is incorporated by reference herein. A multicast version of a link-state routing protocol (MOSPF) has also been developed. For example, see J. Moy, supra. These particular multicast schemes were designed for densely distributed group members. Furthermore, these multicast schemes were designed for supporting separate source based trees for each sender. More recently, protocols for sparsely distributed group members have also been proposed. For example, see A. J. Ballardie et al., Core based trees, Proceedings of the ACM SIGCOMM, 1993; and S. Deering et al., An architecture for wide-area multicast routing, Proceedings of the ACM SIGCOMM, August, pp. 126–135, August 1994, each of which is incorporated by reference herein.

A key characteristic of conferencing or online chat/discussion groups is that there are typically several speakers sending messages at various times during a discussion session and any listener may decide to contribute to the discussion. Additionally, speakers (senders) are also listeners (receivers) of messages. Currently, discussion groups, such as news groups and other talk groups, are implemented by all traffic being sent to a central site. The traffic is then rebroadcast from the central site to all participants of a group using well-known unicast techniques. A higher bandwidth than what is presently available will be needed for discussion groups configured in this manner so that video and audio information can be sent along with textual information and so that such groups can operate in real-time. As the number of this type of discussion groups increases, currently available multicasting protocols will not suffice.

Two types of trees have generally been used for multicast routing: source-based trees and shared trees. In particular, the previously mentioned DVMRP protocol sets up source-based trees, while core-based tree (CBT) protocols develop shared trees. For example, see A. J. Ballardie et al., supra. The advantages and disadvantages of these two types of multicast spanning trees are well-known. For example, source-based trees are best suited for minimum delay type applications, but have a serious scaling problem because each router in a source-based tree maintains state information for every source-group pair. A core-based tree protocol sets up a single multicast tree having one or more cores for an entire group. Additionally, a core address is used in data packets for multicasting routing, and no distinction is made between senders and receivers. The scaling problem associated with source-based trees is overcome by shared trees, but it is argued in the literature that each link of a shared tree suffers from traffic concentration for certain applications. Another disadvantage of core-based trees is that members join and leave the shared tree in a distributed manner which usually causes the tree to drift away from an optimal configuration during the course of a given multicast session.

The Protocol Independent Multicasting (PIM) approach has been taken by the internet community. See S. Deering et al., supra. The PIM protocol approach has a major drawback caused by separating senders from receivers. In fact, this protocol provides no simple way for converting a sender into a receiver in an existing multicast tree. Consequently, the PIM protocol approach has drawbacks with certain applications, such as conferencing and chat groups, in which senders and receivers interchange roles often during a session.

Steiner trees have been suggested at various times for use in multicasting. For example, see V. P. Kompella et al., Multicasting for multimedia applications, Proc. IEEE INFOCOM, pp. 2078–2085, 1992, Ph.D. Thesis; L. Wei et al., A comparison of multicast trees and algorithms, CS. Dept. Tech. Report, Univ. of Southern California, September 1993; and H. F. Salama et al., Comparison of Multicast Routing Algorithms for high-speed networks, IBM Tech. Report, September 1994, each of which is incorporated by reference herein. The problem of determining a Steiner tree for a multicast network, that is, the minimum weight tree spanning a given subset D of a graph W, is known as the Steiner problem for networks. The problem has been well-studied and is known to be an NP-complete problem. For example, see R. M. Karp, Reducibility among combinatorial problems, Complexity of Computer Computations (R. E. Miller and J. W. Thatcher, eds.), Plenum Press, 1972, which is incorporated by reference herein. Nevertheless, reasonable heuristics exist for finding an approximate solution in polynomial time. For example, the Takahashi Matsuyama heuristic, disclosed by H. Takahashi et al., An approximate solution for the Steiner problem in graphs, Math. Japonica, vol. 6, pp. 573–577, 1980, incorporated by reference herein, has been effectively used for determining approximate Steiner trees, such as the approximate Steiner trees disclosed by S. Hakimi, Steiners problem in graphs and its applications, Networks, vol. 1, pp. 113–133, 1971, incorporated by reference herein. Another heuristic for finding an approximate solution is disclosed by V. Rayward-Smith, The computation of nearly minimal Steiner trees in graphs, Int. J. Math. Educ. Sci. Tech., vol. 14, pp. 15–23, 1983, incorporated by reference herein. Some work has also been done in computing constrained Steiner trees in a centralized manner. For example, see V. P. Kompella et al., supra. Distributed versions of the same algorithm are presented by V. P. Kompella et al., Multicast routing for multimedia communications, IEEE/ACM Trans. on Networking, vol. 1–3, pp. 286–292, June 1993, incorporated by reference herein. Nevertheless, Steiner trees have generally been deemed to be unsuitable for multicasting because the maximal delay is longer than the maximal delay for shortest path trees, and it is often argued that traffic is concentrated on the Steiner spanning tree links whereas traffic is more distributed in shortest path-type trees.

What is needed is a multicast routing protocol that defines how a multicast session is initiated and terminated, and how members to the session join and leave a multicast group. Additionally, a multicast routing protocol is needed that periodically recomputes a near-optimal Steiner tree for a multicast group that changes dynamically, and periodically allows switching from an old Steiner tree to a new Steiner tree. Further, a multicast protocol is needed that provides a high probability of delivery during transitions from an old tree to the newly computed tree, even when membership to a multicast session changes rapidly, for example, such as in a mobile environment. Further still, a multicast protocol is needed that provides inter-domain multicasting with fault tolerance features.

SUMMARY OF THE INVENTION

The present invention is directed to a system and a method providing a conferencing/discussion group Steiner tree multicast (CSM) protocol architecture. According to the invention, the CSM protocol provides symmetric multicast capability, that is, group communication with any node of a group, with each node able to be either a sender or a receiver. Additionally, the CSM protocol controls initial entry of members into a discussion group and supports more sophisticated security mechanisms that can be developed for the Internet environment. The CSM protocol also provides dynamic joining and leaving of members of a discussion group. A close-to-optimal (CO) Steiner tree used for a discussion group is synchronously and periodically modified for maintaining a suitable spanning tree. Consequently, as membership to a discussion group changes and the CO Steiner tree in use is no longer close to optimum, the multicast session is continued on a revised CO Steiner tree by using a dualcast mode during a changeover to a newly computed CO Steiner tree. The dualcast mode reliably transmits packets using two different Steiner trees for the multicast session and minimizes any loss of quality of the multicast communication caused by dropped or delayed packets. The present invention also includes at least one mobile support station that is connected to the CO Steiner tree, with each mobile support station providing a communication link between a mobile application and the CO Steiner tree.

BRIEF DESCRIPTION OF THE DRAWING

The present invention is illustrated by way of example and not limitation in the accompanying figures in which like reference numerals indicate similar elements and in which.

DETAILED DESCRIPTION OF THE INVENTION

Figure 1:
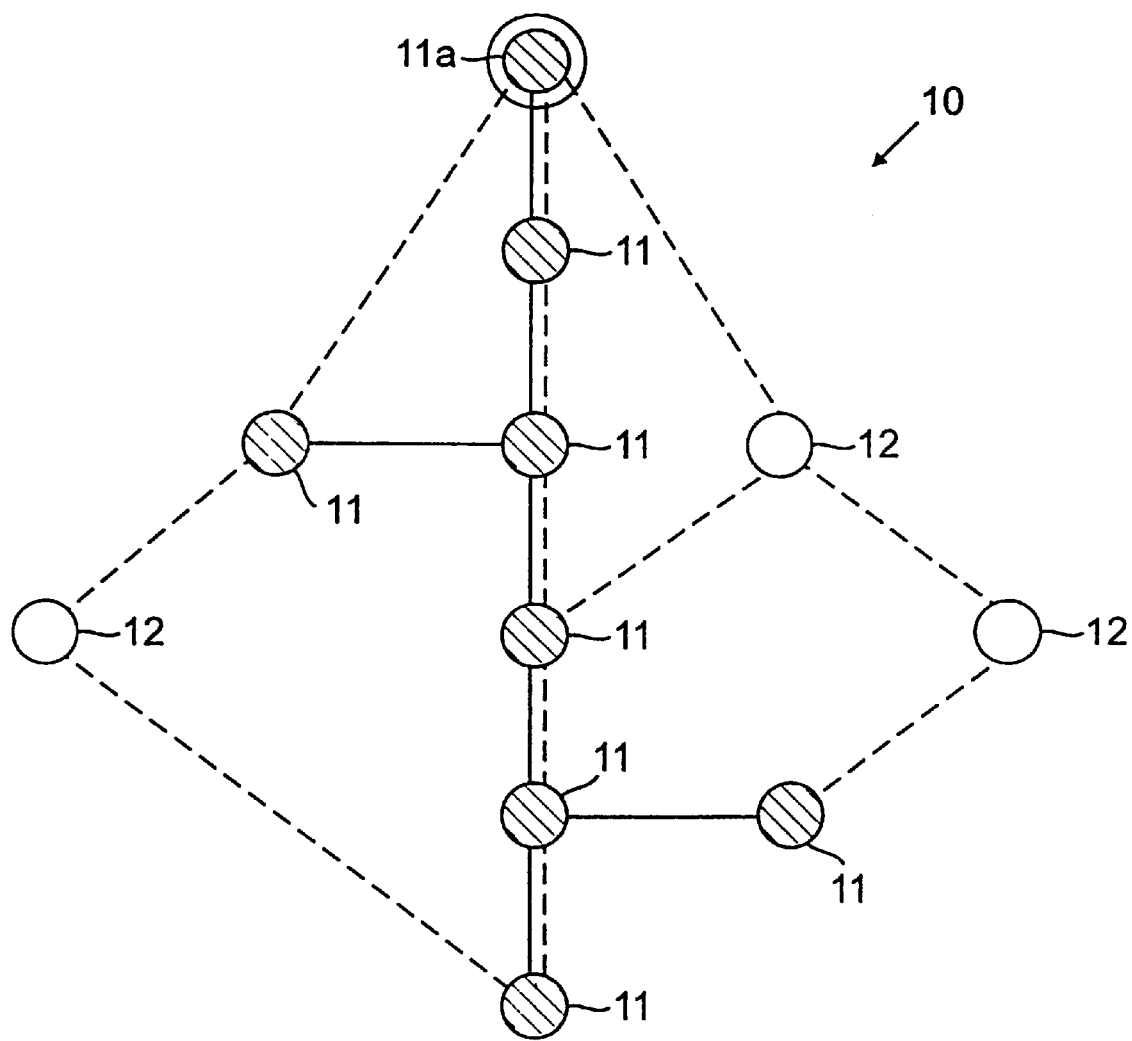
FIG. 1 shows a comparison of links of a Steiner Tree and of a Shortest Path Tree.

The conference group Steiner multicast (CSM) protocol of the present invention provides a protocol architecture that operates over current unicast Internet architectures using multicast routers as in the Mbone. The CSM protocol is designed for use in discussion group environments having more than one active speaker and in which each active speaker is also a listener, in addition to discussion group environments having only one speaker and a plurality of listeners. The protocol of the present invention conveniently scales for a large number of simultaneous multicast discussion groups because both admission policy functions and shared trees for each respective session are distributed throughout a network. The CSM protocol allows members of a multicast group to easily join or leave the group, whether the group is a sparse or a dense group. A basic level of security is provided by a registration mechanism that filters members who are allowed to join a multicast group. The CSM protocol also adaptively determines when a current multicast tree is not optimal and switches, or changes, to a more efficient multicast tree synchronously with respect to dynamic aspects of group membership changes.

The CSM protocol of the present invention belongs to the shared-tree category, in the sense that a single multicast tree is set up for a single group with no distinction being made between senders and receivers. Although the present invention generates a single shared tree similar to a core-based tree (CBT), there are several fundamental differences between the present invention and a core-based tree. First, the shared tree of a CBT approach has one or more cores, while the shared tree of the CSM protocol is a close-to-optimal Steiner tree having no cores. Secondly, members join and leave the shared tree of a core based tree in a distributed manner, typically causing the core-based tree to gradually drift away from an optimal configuration during a given multicast session. In the approach of the present invention, members similarly join and leave in a distributed manner, but an optimal Steiner tree for the group at hand is periodically computed and a switch is made from an old tree to a newly computed tree, thereby guaranteeing a close-to-optimal Steiner tree at all times during the multicast session. Furthermore, the protocol of the present invention uses regular IP Class-D address for multicasting of information, while a core-based tree approach uses a core address contained in the data packets for multicasting.

The CSM protocol of the present invention has the three major phases: (1) initialization, in which a new discussion group is registered and a close-to-optimal (CO) Steiner tree is determined for that group; (2) ongoing operations, in which group members send multicast messages to other group members, and in which group membership changes as members join and leave the group; and (3) switching, in which a new CO Steiner tree is required and a dualcast mode is used for a fault-tolerant transition to a new CO Steiner tree. The switching phase is similar to that disclosed by S. Aggarwal et al., DUALCAST: a scheme for reliable multicasting, Proc. of the 1994 Int. Conf. on Network Protocols, pp. 15–21, October 1994, incorporated by reference herein.

While Steiner trees have generally been deemed to be unsuitable for multicasting because the maximal delay is longer than that for shortest path trees, and it is thought that traffic is concentrated on the Steiner spanning tree links, whereas traffic is more distributed in shortest path-type trees, the present invention uses Steiner trees for multicasting for conferencing and online discussion groups. Although the maximal delay is longer over Steiner trees, studies on center-based trees, such as by D. W. Wall, Mechanisms for broadcast and selective broadcast, Ph.D. Thesis, Stanford University, June 1980, incorporated by reference herein, show that the maximal delay for center-based trees is twice the shortest path delay. A simulation study using random graphs shows that the maximal delay of core-based trees is 1.4 times that of shortest-path trees. See S. Deering, et al., supra. Regardless, maximal delay is not considered to be a problem for the present invention with respect to discussion groups because it is possible to incorporate maximal delay tolerance algorithms into the heuristic used for determining a close-to-optimal Steiner tree.

The second proffered reason suggesting that Steiner trees are unsuitable for multicast operations is misleading when considering a situation of a large number of discussion groups, in which each group is a sparse subset of a larger graph. For a single discussion group situation, traffic is concentrated on the Steiner links by design since a Steiner tree is the optimal spanning tree. Traffic using shortest path trees traverses other links in the network, thereby affecting more links during a multicast session than a Steiner tree situation. More traffic is generated overall for a shortest path tree situation because shortest path trees tend to bifurcate traffic earlier than a Steiner tree situation. That is, a packet multicast over a shortest path tree is duplicated relatively early, generating more network traffic, while the same packet multicast over a Steiner tree is not duplicated until relatively later, generating a correspondingly less amount of network traffic.

This concept is illustrated in FIG. 1 where a plurality of routers are shown connected together in an exemplary administrative domain 10. Routers or nodes 11, indicated as solid circles, are member routers of a multicast group. Routers or nodes 12, indicated as empty circles, are non-member nodes of the multicast group. The solid lines connecting member routers 11 represent Steiner tree links of a Steiner tree. The dotted lines connecting member and non-member routers represent shortest path links of a shortest path tree. From sender router 11a, the cost of each edge is identical for either the Steiner tree or the shortest path tree for exemplary domain 10. The Steiner tree, though, generates less overall traffic by using 7 tree links, while the shortest path tree uses 10 tree links.

As the number of discussion groups increases in a network, the total traffic essentially increases more for source-based trees than for Steiner trees. Even when the total traffic is distributed in the network for source-based trees, more links in the network become overloaded, as opposed to only the Steiner links for the case of Steiner trees. Thus, source-based trees lose the much acclaimed advantages of distributing traffic in a real network when a large number of simultaneous multicast sessions occur.

The CSM protocol is intended for an administrative domain where an underlying unicast routing protocol, such as OSPF or RIP, is used. A domain is defined herein to be an area served by a set of cooperating routers running the same routing protocol and maintaining the complete network configuration for the domain. According to the invention, the multicast routers run a version of the CSM protocol over a multicast Steiner backbone (MSBone) that is analogous to a set of multicast routers running MOSPF or DVRMP over the Mbone. The MSBone, indicated in FIG. 1 as solid lines connecting routers 11, is implemented by routers 11 running a multicast Steiner routing daemon msrouted in the CSM protocol in a manner that is analogous to routers running mrouted in Mbone. The term multicast router or simply router, as used herein, is defined to be a cooperating router over the MSBone that is running msrouted, an approximate Steiner tree heuristic. A cooperating router over MSBone could also be running any shared tree algorithm that uses the concept of Application Assisted Routing (AAR), which is based on input from a session initiator.

Links between multicast routers 11 include tunnels that may pass through several unicast routers. Multicast routers 11 are also running a protocol, such as OSPF, for dynamically adapting to faults on the links (tunnels) and nodes. Furthermore, as in OSPF, multicast routers 11 have the complete topology of the MSBone available. Nevertheless, CSM is not completely independent from the underlying unicast protocol. When the underlying protocol is OSPF, then obtaining information required for dynamically adapting to faults is straightforward. When the underlying protocol is a distance vector routing protocol, then obtaining the required information is more complicated, but still possible. Thus, the issue of adapting to faults is separated into a portion that is handled as in OSPF and a portion that is handled by the CSM protocol as described below. Further, there is some support at the application layer for filtering out duplicate packets. For many applications that use a higher level protocol such as RTP, this support is automatically included.

There is an application level daemon running in each domain that is an area multicast sessions directory (MSD) server that is accessible to potential participants wishing to determine possible multicast conferencing/discussion group sessions to join. An area MSD server is similar to a session directory (sd) in Mbone, as disclosed by H. Eriksson, supra, but could also be built in a decentralized hierarchical manner.

Figure 2:
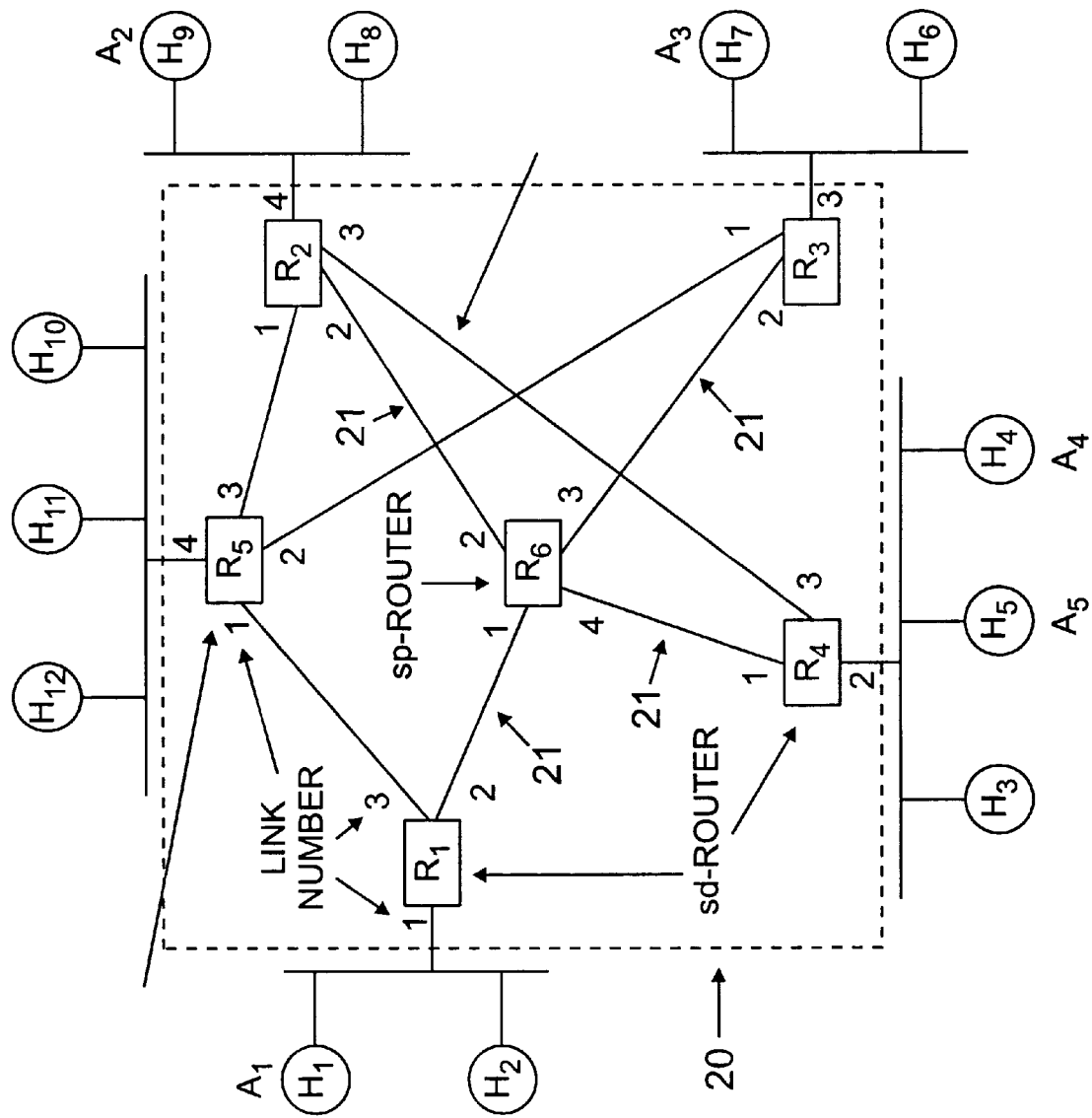
FIG. 2 which shows a schematic block diagram of a plurality of cooperating multicast routers connected as part of an MSBone according to the present invention.

Throughout the following disclosure explaining the aspects and features of the present invention, the following notation is used. A discussion group G consists of a set of n applications involved in a multicast session. Each application A sends or receives multicast messages to or from all other applications in group G. The ith application in group G is referred to as $A_i$, its corresponding host node is $H_i$, and the nearest multicast router R to $H_i$ is $NR_i$. By definition, the nearest multicast router is the nearest router on the MSBone that is running msrouted. The CO Steiner tree of the CSM protocol is a spanning tree covering the multiset $\{NR_i, \ldots, NR_n\}$, and is referred to as Tree(G). FIG. 2 shows a schematic block diagram of a plurality of cooperating multicast routers connected as part of an MSBone 20.

Associated with each application $A_i$ is traffic information $T_i$ relating to the expected traffic generated by application $A_i$ in terms of an average rate and a peak rate, for example. Traffic information $T_i$ can also include information relating to traffic reception by application $A_i$, as well as traffic generation. The traffic information multiset $\{T_i, \ldots, T_n\}$ can be used as a parameter for the computation of a CO Steiner tree.

An area MSD server is established in each domain and a multicast group becomes operational after registering with the area MSD server associated with a domain. The MSD server maintains information regarding each registered group, such as the multicast group IP address and port number, the group type, group membership, and the description of the multicast. The information entry for group G in the MSD server is referred to herein as an Entry. Each area MSD server communicates with area MSD servers in other domains so that current information regarding each multicast session is available to all potential participants.

Corresponding to each registered group G is an application that initiates registration and authenticates new group members when the group is a closed-type group. The application having this responsibility is referred to as the Gatekeeper Application (GA(G)), and the router associated with this application is referred to as the Gatekeeper Router (GR(G)). GR(G) is the closest router to the Gatekeeper Application. The Gatekeeper Application is specific to a group G and usually runs on the same local area network (or even host) as the application initiating the group. For simplicity, the Gatekeeper Application will be identified with the initiating application herein, although the Gatekeeper Application can be a distinct application from the initiating application.

The logical distinguishing entities that can send and receive messages are thus an Application (A), a Router (R), an MSD, a NearestRouter (NR), a Gatekeeper Application (GA) and a Gatekeeper Router (GR). A Mobile Support Station (Mss) is a logical entity associated with mobile applications, and is described in greater detail below.

Message primitives are exchanged between the logical entities and are of the form Source_Destination_Message (parameters) followed by request/reply, where Source is the sending entity, Destination is the target entity, message is the name of a message, and parameters are specific to a given message. A Request typically represents a request for a specific service, while a Reply is the response corresponding to a given Request. For example, the message A_GA_Join_sparse($A_j$, $NR_j$) is a Join_sparse request message from an application A (source) to the Gatekeeper Application GA (destination) having parameters $A_j$ and $NR_j$.

The notations used herein are summarized in Table 1:

TABLE 1

| | |
|---|---|
| $A_i$ | ith application belonging to group G |
| $H_i$ | Host machine running $A_i$ |
| $R_i$ | Multicast router serving $H_i$ |
| $T_i$ | Traffic descriptor corresponding to $A_i$ |
| GA | application initiating a session for group G |
| GR | multicast router serving GA |
| MSD | Multicast Session Directory |

In FIG. 2, routers $R_1$ through $R_6$ are multicast routers that are connected as part of an MSBone 20. A plurality of host machines $H_1$ through $H_{12}$ are connected to multicast routers $R_1$ through $R_5$. A plurality of applications $A_1$ through $A_5$ are run on host machines $H_1$, $H_9$, $H_4$ and $H_5$, respectively, and are each part of a multicast group G. The links of the Steiner tree for multicast group G are indicated by 21. An area MSD server can be located at any host connected to MSBone 20, for example, host $H_{13}$, or alternatively the MSD server can be located at a multicast router.

Consider an example of application $A_1$ registering a discussion group G with an area MSD server located at host $H_{13}$. For this example, since application $A_1$ is the initiator of discussion group G, application $A_1$ becomes the Gatekeeper Application GA(G) for group G. GA(G) determines the closest multicast router in the same manner as is done in Mbone. In this case the closest multicast router, $R_1$, becomes the Gatekeeper Router GR(G). The Gatekeeper Application GA(G) contacts the area MSD by sending a GA_MSD_Register request message containing the IP address of the GA(G), the type of group Type(G), the membership of the group Membership(G), and the description of the group Description(G).

The group Type(G) can be, for example, an open group or a closed group. An open group is defined to be a group that any participant can join without permission to join being granted by Gatekeeper Application GA(G). A closed group is defined to be a group that the GA(G) is responsible for admitting new participants. Of course, other types of groups can be defined. Group Type(G) information also contains information indicating whether the discussion session is expected to be a Sparse set or Dense set. A discussion group is Sparse or Dense depending on the relative number of domains spanned by the multicast and the relative number of participants in each domain.

Membership(G) includes the initial set of applications that are involved in the discussion group. The Gatekeeper Application GA(G) is always a member of the discussion group it initiates. Other applications can dynamically join and leave the discussion group. The membership information about each member application and GA(G) includes the respective IP addresses of the corresponding hosts and an application ID uniquely identifying a member application running on a host. Membership information is not required for open groups except for information about the GA(G). Description (G) includes information used by potential participants for deciding whether to join a session. For example, Description (G) includes information relating to the nature of a particular multicast group to the area MSD server.

Returning to the example, the area MSD server replies to the GA_MSD_Register request message by adding the new group to a list of discussion groups by creating an Entry for the group and sending an MSD_GA_Register reply message back to GA(G). The area MSD server also determines the Address(G) for the group, which is a multicast IP address and port at which the group will operate. Thus, an Entry contains at least the following information: Address(G), Type(G), Membership(G), Description(G), GA(G), and GR(G). The contents of an exemplary area MSD server table are shown in Table 2.

TABLE 2

| Entry[1] | Address = < Class-D IP Address, Port Number ><br>Type = closed, sparse<br>Membership = $\{A_i\}$<br>Description = "Discussion on Stock Prices"<br>GA = < Host IP Address, Application ID ><br>GR = < Router IP Address > |
|---|---|
| . | |
| . | |
| . | |
| Entry [n] | Address = < Class-D IP Address, Port Number ><br>Type = open, dense<br>Membership = $\{A_i\}$<br>Description = "Super Bowl"<br>GA = < Host IP Address, Application ID ><br>GR = < Router IP Address > |

The Gatekeeper Router GR(G) performs a major function of the CSM protocol by computing Steiner trees. For a given group G, the corresponding Steiner tree includes a set of multicast routers implementing the CSM protocol and operating over the MSBone. GR(G) maintains the information about the set of multicast routers Routers(G) forming the Steiner tree. The terms Router(G) or Routers(G) are used herein for respectively referring to a specific node or generally to the nodes of the Tree(G), where Tree(G) is the close-to-optimal Steiner spanning tree determined by the heuristic used. A backup Gatekeeper Router GRB(G), such as multicast router $R_6$, can be used for additional reliability by taking control of the group from a current GR(G) in the event that the current GR(G) crashes. Initially, GR(G) only needs information regarding the routers that are the closest to each application involved in the discussion group so that the corresponding CO Steiner tree can be computed. A multicast router that directly serves an application is referred to herein as an sd router (source/destination router) or an sd node. In FIG. 2, multicast routers $R_1$, $R_2$, $R_3$ and $R_4$ are sd routers. Additional multicast routers are sometimes needed to form the CO Steiner tree computed by GR(G). The routers in the CO Steiner tree that are not associated with an application, but yet are required for forwarding packets, are referred to herein as sp routers (Steiner Point routers) or sp nodes. Router $R_6$ in FIG. 2 is an exemplary sp router.

Once GA(G) receives the MSD_GA_Register reply message from the area MSD server, GA(G) passes the list of sd routers to GR(G) so that a CO Steiner tree over which packets will be sent can be computed. The GR(G) stores the complete topology of its domain, that is, the topology of both the sd and sp multicast routers over the MSBone in the domain, and is thus able to compute an approximate Steiner tree using one of the well-known approximate Steiner tree algorithms, such as the Takahashi Matsuyama heuristic. The input to the Takahashi Matsuyama heuristic is information relating to all the multicast routers in the domain and the associated link information, similar to the type of informational input that a conventional protocol, such as OSPF, requires. Additionally, the set of sd routers associated with the applications in the discussion group must be known. The approximate Steiner tree heuristics can also use traffic information for helping define a more appropriate Steiner tree. The resulting spanning tree is a close-to-optional (CO) Steiner tree that uses a common set of links for transmitting packets.

Only the Gatekeeper Router GR(G) computes the Steiner tree and is responsible for subsequent updates of the Steiner tree. For each group G, there is a GR(G), but any multicast router can be a GR(G). Consequently, for a large number of discussion groups, the functions of the Gatekeeper Router GR(G) for each respective group G are fairly uniformly spread among the multicast routers, enhancing the scalability features of the present invention. Additionally, calculating the CO Steiner tree is similar in its polynomial time complexity to the polynomial time complexity calculations for OSPF or MOSPF. Furthermore, just as in the Mbone, the multicast routers running msrouted communicate with one another through tunnels that are transparent to the architecture of the present invention.

GR(G) sends io-set control information that is different to each Router(G) and, consequently, is unicast to each Router (G). The control information is sent in a reliable manner, either by using a simple acknowledgment-based scheme or by sending the information repeatedly. In the case that the Routers(G) form a dense set in the domain, GR(G) can broadcast the list of io-set to all Routers(G) so that each Router(G) can obtain its own io-set control information from the broadcast information. For sparse sets, io-sets are preferably unicast to each Router(G) with an acknowledgment scheme used for reliability.

Routers(G) operate by maintaining only minimal information, thus contributing further to the scalability of the CSM protocol of the present invention. For steady state CSM protocol operation, each Router(G) has an entry termed the $R_{entry}$ corresponding to each discussion group G. Each $R_{entry}$ contains the IP multicast address for a group G, an io-set, and a delivery-set. The io-set is the set of the incoming/outgoing links, called virtual links, to other adjacent Routers(G) for a group. The delivery-set is the set of links, called physical links, to hosts containing applications that are participating in a discussion group (members) and are serviced by the router. Table 3 shows an exemplary arrangement of $R_{entry}$ entries in a routing table at a Router (G).

TABLE 3

| $R_{entry[1]}$ | Class-D Address for Multicast Group 1 | io-set$_1$ | delivery-set$_1$ |
|---|---|---|---|
| . | | | |
| . | | | |
| $R_{entry[n]}$ | Class-D Address for Multicast Group n | io-set$_n$ | delivery-set$_n$ |

In FIG. 2, the io-set for router $R_1$ is $\{2\}$, while the delivery-set for router $R_1$ is $\{1\}$. Similarly, the io-set for router $R_6$ in FIG. 2 is $\{1, 2, 3, 4\}$, while the delivery-set for router $R_6$ is empty. Any IP packet arriving on an io link with the IP multicast address for G is simply forwarded on all the other io links. For example, if a packet for group G arrives at router $R_6$ (FIG. 2) through io link 1, router $R_6$ forwards the packet on io links 2, 3 and 4. If the router is a leaf node of the Steiner tree, the io-set has only one element and the packet is not forwarded to other routers.

If the router is an sd node, the delivery-set is not empty and the router delivers the packet to one or more hosts connected to the router using the delivery set information for final delivery to the applications directly served by the router. For example, when router $R_2$ (FIG. 2) receives a packet through io link 2, router $R_2$ forwards the packet to application $A_2$ running on host $H_9$.

Suppose a new application $A_j$ running on host $H_j$ wishes to join a discussion group. $A_j$ first queries the area MSD server for determining whether there is a discussion group of interest by scanning group entries in the MSD server. For this example, suppose that $A_j$ is interested in joining discussion group G. $A_j$ then obtains the relevant Entry from the area MSD server. $A_j$ joins the discussion session G by having its closest multicast router $NR_j$ join the CO Steiner tree via a path to a router R that is already a member of the Tree(G).

According to the invention, there are two methods that allow $A_j$ to have $NR_j$ join the CO Steiner tree for group G by connecting to a Router(G), a sparse set join operation and a dense set join operation. The particular join method that $A_j$ must use is indicated in the contents of the Entry of the area MSD server, through the type field, for example, and depends on the membership and type of the discussion group. A dense set join operation is only used for Open type groups.

For a sparse set join operation, the Gatekeeper Router GR(G) simply computes the shortest path from the new joining node to any node in the current CO Steiner tree. An exemplary algorithm that can be used for determining a path for joining a new node to an existing source based tree is a parametrized weighty greedy algorithm disclosed by B. M. Waxman, supra. The Waxman algorithm minimizes the following function over all nodes v in the existing tree:

$$W(v)=(1-w)*\text{distance}(newnode, v)+w*\text{distance}(v, source),$$

where the parameter w varies between 0 to 0.5, inclusive. For the present invention, the sparse preferably sets join heuristic set parameter w to be 0. For a dense set join operation, a new node simply connects to the existing CO Steiner tree by attempting to form the shortest path to the Gatekeeper Router GR until a node of the current CO Steiner tree is encountered. This approach is at the other extreme of the Waxman heuristic with the parameter w set to 0.5. A dense set join operation is similar to joining in naive multicast routing, such as disclosed by M. Doar et al., supra, where the shortest path is determined from the source to the joining node, with GR performing the role of source, but is more similar to the join operation in CBT, in which the shortest path from the joining node to the core router as the target is determined, because the CBT heuristic is receiver-initiated with the GR as the target.

Figure 3:
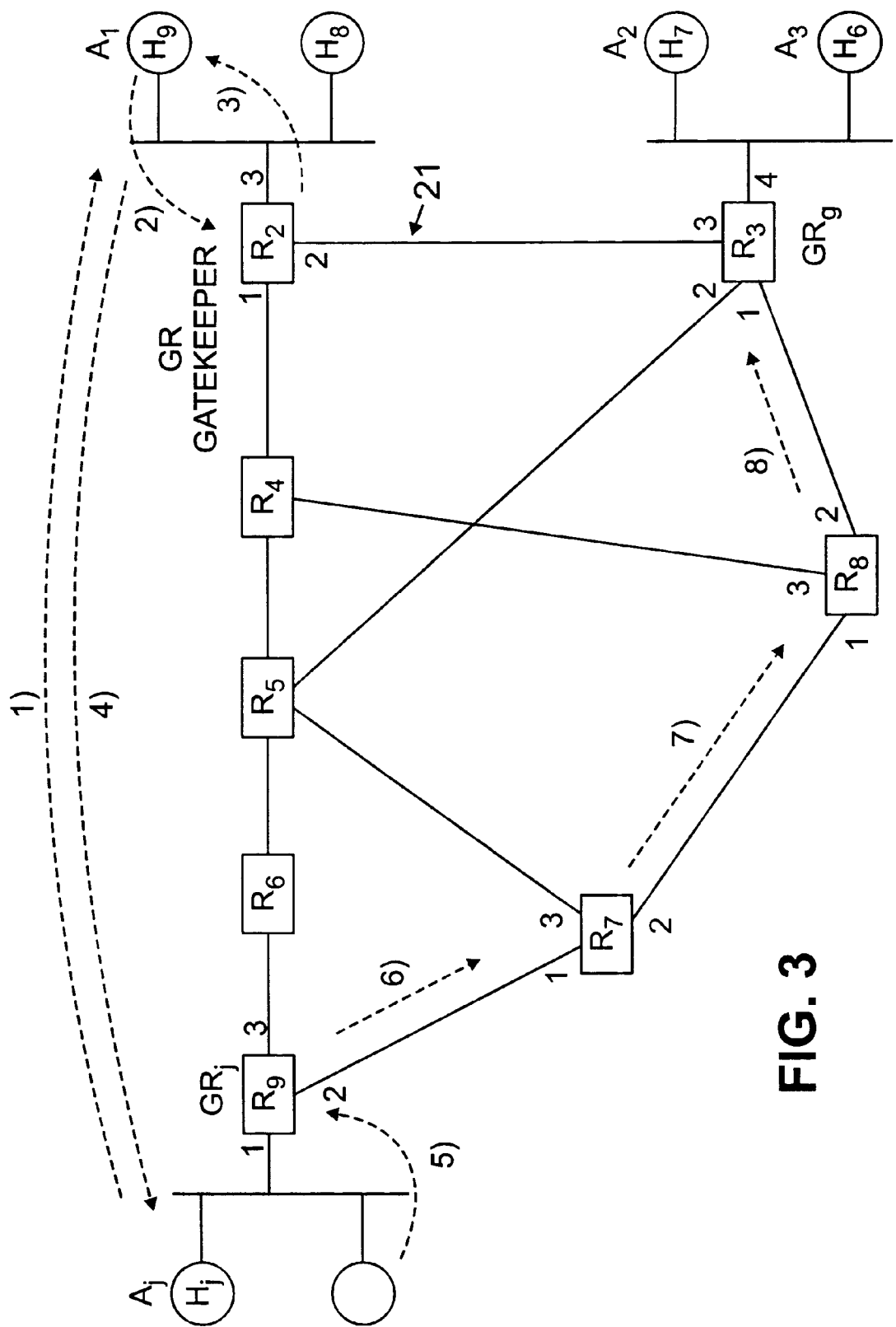
FIG. 3 shows signal flow through an exemplary MSBone illustrating a sparse set join operation according to the present invention.

FIG. 3 shows signal flow through an exemplary MSBone for illustrating a sparse set join operation according to the present invention. The specific actions and messages occurring for a sparse set join and other operations described below are indicated by small dotted lines. All messages are communicated through the MSBone using well-known techniques. The primitive messages that are implemented for a sparse set join operation are: 1) Join_sparse request/reply (between an application and GA); 2) Compute_src_route request/reply (between GA and GR); and 3) Ioset_distribution (from GR to R, no reply necessary).

In FIG. 3, application $A_1$ is the Gatekeeper Application GA(G) for an ongoing discussion group G, and router $R_2$ is the Gatekeeper Router GR(G). Tree(G) for group G is indicated by 21. Application $A_j$ sends an A_GA_Join_sparse ($A_j$, $NR_j$) request message to GA(G) running on host $H_9$ (step 1). GA(G) checks whether $A_j$ is authorized to join group G, and if so, GA(G) sends a GA_GR_Compute_src_route($NR_j$) message to Gatekeeper Router GR(G) located at multicast router $R_2$ (step 2). GR(G) sends a GA_A_Join_sparse(yes/no) reply message to $A_j$ (step 3). If the reply is "yes", GR(G) computes the shortest path from $A_j$ to a current multicast router in the Tree(G), whether it is an sd or an sp router, and updates the io-sets of the relevant routers (Steps 4–7). For example, GR(G) informs router $R_8$ that to join $A_j$ to Tree(G), its neighboring routers in Tree(G) are $R_7$ and $R_3$ (step 4). Router $R_3$ then translates this information into its local io-set link information 1,3.

Figure 4:
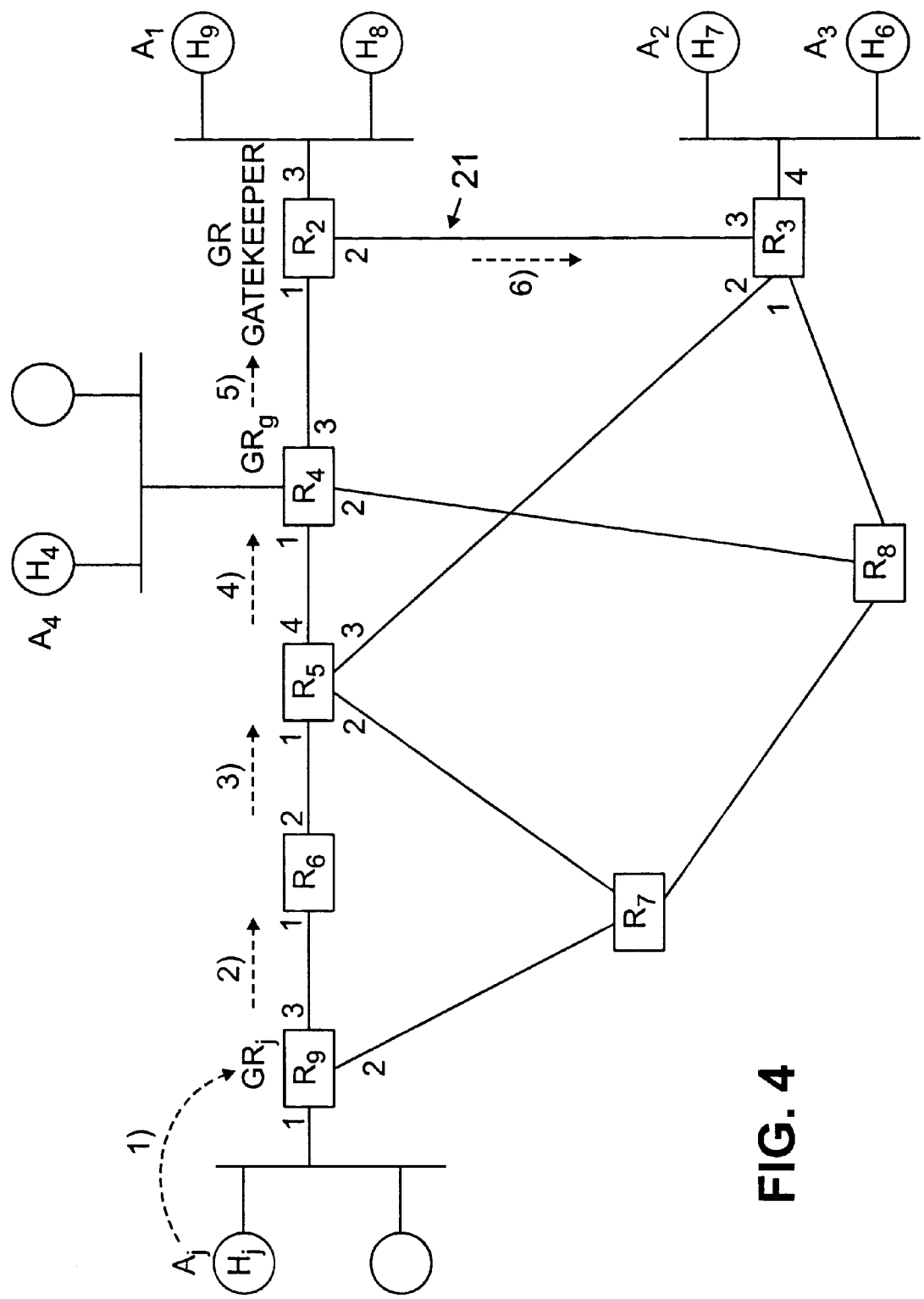
FIG. 4 shows signal flow through an exemplary MSBone illustrating a dense set join operation according to the present invention.

Signal flow for a dense set join operation is shown in FIG. 4. The primitive messages that are implemented for a dense set join are: 1) Join_dense request (from an application to its nearest router, no reply necessary); 2) Join_dense request (from router to router, no reply necessary); and 3) Application_joining_dense (from router to router, no reply necessary). In FIG. 4, application $A_1$ is the Gatekeeper Application GA(G) for an ongoing discussion group G, and router $R_2$ is the GR(G). Tree(G) for group G is indicated by 21. For a dense join operation, application $A_j$ sends an A_NR_Join_dense($A_j$, NR, GR) request message to the closest multicast router $NR_j$ located at multicast router $R_9$ and requests that it join the Tree(G) via the shortest path to GR (step 1). Router $NR_j$ computes the shortest path to GA(G) and uses strict source routing to send an R_R_Join_dense request message to GR(G) via the indicated path (steps 2–4). Each router on the path from $NR_j$ to GR(G) that is not a Router(G) creates an $R_{entry}$ and adjusts its io-set accordingly. The first multicast router that is a member of Tree(G) for this example is router. Router $R_4$ terminates the R_R_Join_dense request message and adds the input link to its $R_{entry}$ io-set. Router $R_g$ sends an R_R_Application_joining_dense request message to all multicast routers on the Tree(G) including GR(G) (steps 5 and 6). Lastly, GR(G) updates the information needed for computing CO Steiner trees.

Completion of a set join operation results a slightly different CO Steiner tree than prior to completion of the join operation. However, all group messages that are being sent by current discussion participants during a set join operation are not affected by addition of the new node. GR(G) also updates the area MSD server entry for group G as appropriate. According to the invention, Gatekeeper Application GA(G) also monitors the group size and other group attributes for determining whether a different joining method is appropriate. For example, an initial set join-type operation might be to always use a sparse set join operation (unless the session is an open group) until more than a predetermined number of multicast routers become part of Tree(G).

Leaving a discussion group depends on the exact information that Gatekeeper Application GA(G) is maintaining regarding the discussion group and group members. For a sparse set leave operation, GA(G) maintains full information on applications and their closest multicast routers. However, for dense set leave operations, GA(G) need not maintain any such information.

Figure 5:
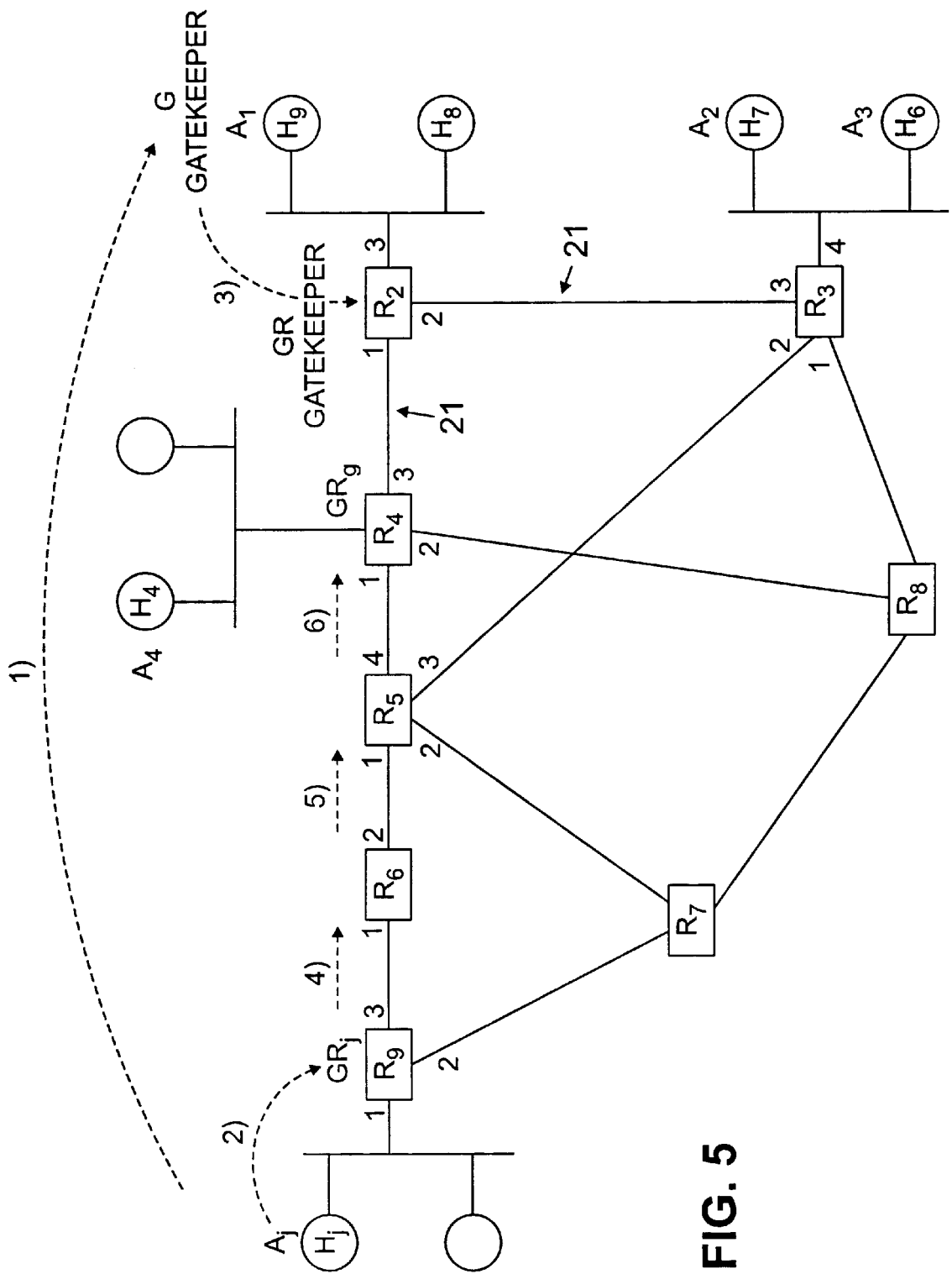
FIG. 5 shows signal flow through an exemplary MSBone illustrating a sparse set leave operation according to the present invention.

FIG. 5 shows signal flow through an exemplary MSBone illustrating a sparse set leave operation. The primitive messages that are implemented for a sparse set leave are: 1) Leave_sparse request (from an application or NR to the GA, no reply necessary); 2) Delete_from_tree_sparse request (from GA to GR, no reply necessary); and 3) Ioset_distribution (from GR to R, no reply necessary). In FIG. 5, application $A_1$ is the Gatekeeper Application GA(G) for an ongoing discussion group G, and router $R_2$ is the GR(G). Tree(G) for group G is indicated by 21. Suppose an application $A_j$ decides to leave discussion group G. Application $A_j$ sends an A_GA_Leave_sparse($A_j$, $NR_j$) request message to GA(G) (step 1). The Gatekeeper Application GA(G), on receiving an A_GA_Leave_sparse($A_j$, $NR_j$) request message, sends a GA_GR_Delete_from_tree_sparse($A_j$, $NR_j$) to GR(G) located at router $R_2$ (step 2). GR(G), on receiving the GA_GR_Delete_from_tree_sparse($A_j$, $NR_j$) request message, updates the information necessary for computing the CO Steiner tree by dropping one or more multicast routers that were needed only to service application $A_j$, and sends that affected routers new values of io-sets by using ioset_distribution messages (steps 3–6).

For a dense set leave operation, application $A_j$ does not need to contact Gatekeeper Application GA(G) before dropping out. Therefore, GR(G) does not get the updated information from GA(G) as with the sparse set leave operation. However, GR(G) is responsible for periodically computing the CO Steiner tree and needs this type of information for properly computing a CO Steiner tree. This is done by including two parameters in the R_R_Node_leaving_dense request message, such as a flag and a list of routers. The flag, which is propagated along with the R_R_Node_leaving_dense request message, indicates whether the multicast routers already receiving the R_R_Node_leaving_dense request message were themselves allowed to leave Tree(G). The flag is initially set to 0, for example, indicating that any router receiving the R_R_Node_leaving_dense request message with flag=0 can drop out of the tree, and add itself to the list of routers contained in the R_R_Node_leaving_dense request message. The first router serving an application other than $A_j$ (directly or as an sp node) sets the flag to 1, indicating that the subsequent routers receiving the R_R_Node_leaving_dense request message cannot leave Tree(G). Hence, the list of routers in the subsequent R_R_Node_leaving_dense request message would remain unaltered. So, when GR(G) receives the R_R_Node_leaving_dense request message, the specific routers that can be dropped from the computation of the next CO Steiner tree are identified.

Figure 6:
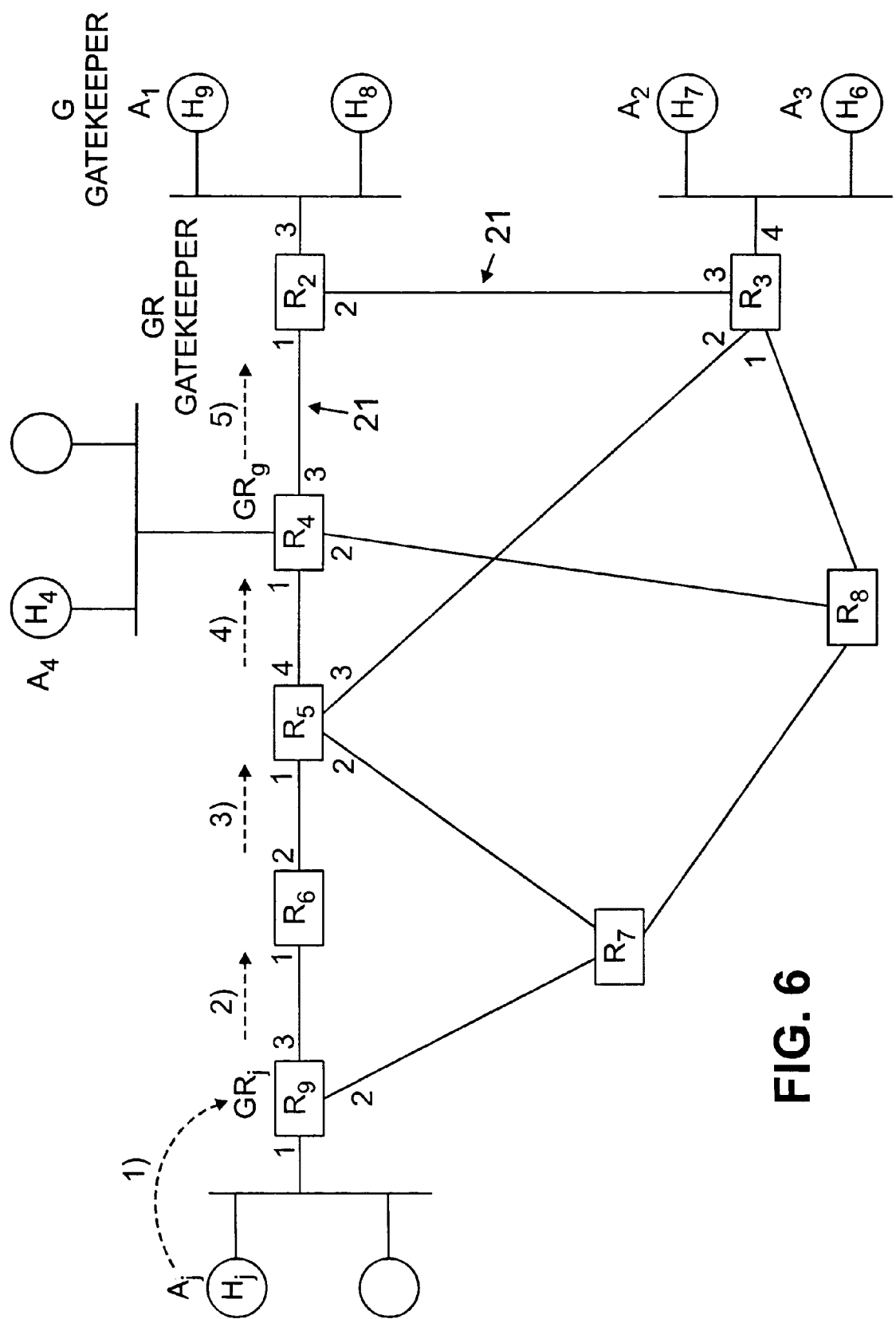
FIG. 6 shows signal flow through an exemplary MSBone illustrating a dense set leave operation according to the present invention.

FIG. 6 shows signal flow through an exemplary MSBone for a dense set leave operation. The message primitives that are implemented for a dense set leave are: 1) Leave_dense request message (between and application and its nearest router); 2) Leave_dense poll message (between NR and the corresponding application); and 3) Node_leaving_dense request message (between routers). In FIG. 6, application $A_1$ is the Gatekeeper Application (GA(G)) for an ongoing discussion group G, and router $R_2$ is the GR(G). Tree(G) for group G is indicated by 21. Application $A_j$ sends an A_NR_Leave_dense($A_j$, $NR_j$) request message to router $NR_j$ located at router $R_9$ indicating that application $A_j$ is leaving discussion group G (step 1). Router $NR_j$ can reply to confirm the leave message. Alternatively, router $NR_j$ might determine that $A_j$ has left the discussion group via polling. If router $NR_j$ is serving only $A_j$ and has only one link in its io-set, $NR_j$ sends an R_R_Node_leaving_dense(flag=0, $NR_j$) request message to the adjacent multicast routers in the Tree(G) (step 2). A multicast router, on receiving an R_R_Node_leaving_dense request message from an adjacent router, reduces its io-set by that link. If the io-set is reduced to one remaining link, and the router is not serving any applications in discussion group G, and the router, in turn, adds itself to the list of routers in the R_R_Node_leaving_dense request message. The message is propagated further with flag=0 (steps 3 and 4). Otherwise, the first router $R_g$ in Tree(G) not able to leave Tree(G) propagates the R_R_Node_leaving_dense request message with flag=1 toward GR (step 5). The R_R_Node_Leaving_Dense message only propagates until it reaches GR(G). Preferably, an R_R_Node_leaving_dense request message with flag=1 can be unicast directly to GR.

Completion of a leave operation results in a slightly different CO Steiner tree than prior to completion of the leave operation. However, just as for a join operation, all ongoing G session messages are delivered to the session members without interruptions.

As join and leave operations occur, the current Steiner tree will likely no longer be a an optimal tree for the multicast group members still involved. Consequently, a new close-to-optimal Steiner tree is periodically recomputed. The events triggering recomputation depend on circumstances such as, the number of join and leave events, other changes in the network or domain topology, and new information relating to traffic patterns, both in the network as well as within the multicast group G. Since the initial Entry in the area MSD server can contain expected traffic information for the group G, and since GR(G) receives all messages from any application in group G, GR(G) may have much better knowledge of the traffic situation on an ongoing basis. Further, recomputation can also be based on applications in the discussion group deciding that some other type of shared tree might now be more appropriate and using Application Assisted Routing (AAR) to inform GR.

Figure 7:
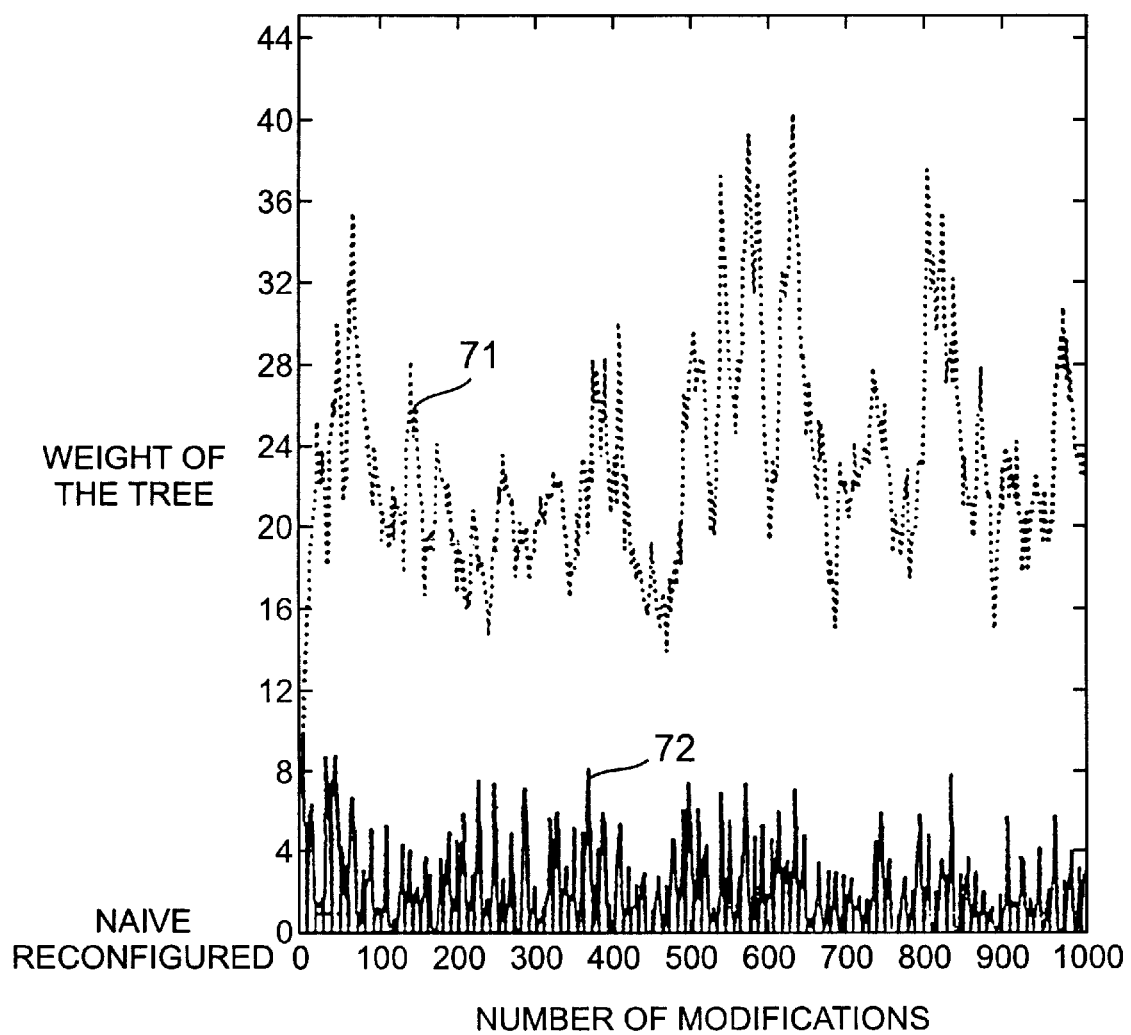
FIG. 7 is a graph showing tree weights of a multicast group for a periodically recomputed CO Steiner tree compared to a naive Steiner tree configuration after a predetermined number of join/leave events.

Regardless of whether GR(G) uses traffic information, it is necessary to operate on a possibly better tree as the tree changes caused by join and leave operations. Thus, after a predetermined number of join/leave events, GR(G) recomputes the CO Steiner tree. FIG. 7 is a graph showing the inefficiency of periodically computed Steiner trees for a multicast groups compared to a naive Steiner tree configuration after a predetermined number of join/leave events. The abscissa of the graph of FIG. 7 is the number of join/leave operations, while the ordinate is the inefficiency of the respective trees. For the graph of FIG. 7, a new member was added to a tree at the nearest node to the current CO Steiner tree. Group membership was modified randomly, that is, a member was added or removed randomly, but the approximate size of the group was maintained. The ease in which the current CO Steiner tree was then reset to the optimal CO Steiner tree (based on the heuristic algorithm) after a predetermined number of events was compared to a tree that was not reset (naive). The inefficiency is a measure of the percent increased weight of the current CO Steiner tree vs. an optimal CO Steiner tree found from the heuristic. In FIG. 7, the upper dotted line 71 shows the result of not resetting the tree (naive), and the lower solid line 72 shows the result of resetting the tree every 10 modifications to the optimal CO Steiner tree (reconfigured). Both the upper and lower lines are averages of 200 runs. From FIG. 7, it can be seen that periodic transitions to a new tree reduces the average inefficiency from around 24 percent to about 3 percent.

Computation of proposed trees is done synchronously with other activities, and can be done as a background process. The recomputed CO Steiner tree is referred to herein as the proposed Tree(G), as compared with the current Tree(G). If the difference between the two trees exceeds a predetermined threshold, then GR(G) initiates a switch tree operation for switching from the current Tree(G) to the proposed Tree(G). Although join and leave operations can be acknowledged during a switch tree operation, only the situation where join and leave operations are queued until the switch tree operation will be completed is described.

The switch tree operation of the present invention switches over from the current CO Steiner tree to the proposed CO Steiner tree and is similar to a join operation, but differs in that the complete destination set is known in advance. The switch tree operation starts with one arbitrary node of the destination set D and its trivial (partial) spanning tree. That node then iteratively chooses the closest node in the remaining destination set and updates the partial spanning tree by adding the path from this closest node to the tree. Once the new CO Steiner Tree computation is complete, GR effects the switch from the current tree. During the transition to the new tree, routers are forwarding messages on both the current and the proposed tree links, thus providing fault-tolerance for incorrectly propagated packets during the transition period. This aspect of the present invention is a dualcast operation because the session is multicasted on two separate Steiner trees. A true Dualcast, such as disclosed by Aggarwal et al., supra, can operate at the application level for additional reliability.

Figure 8:
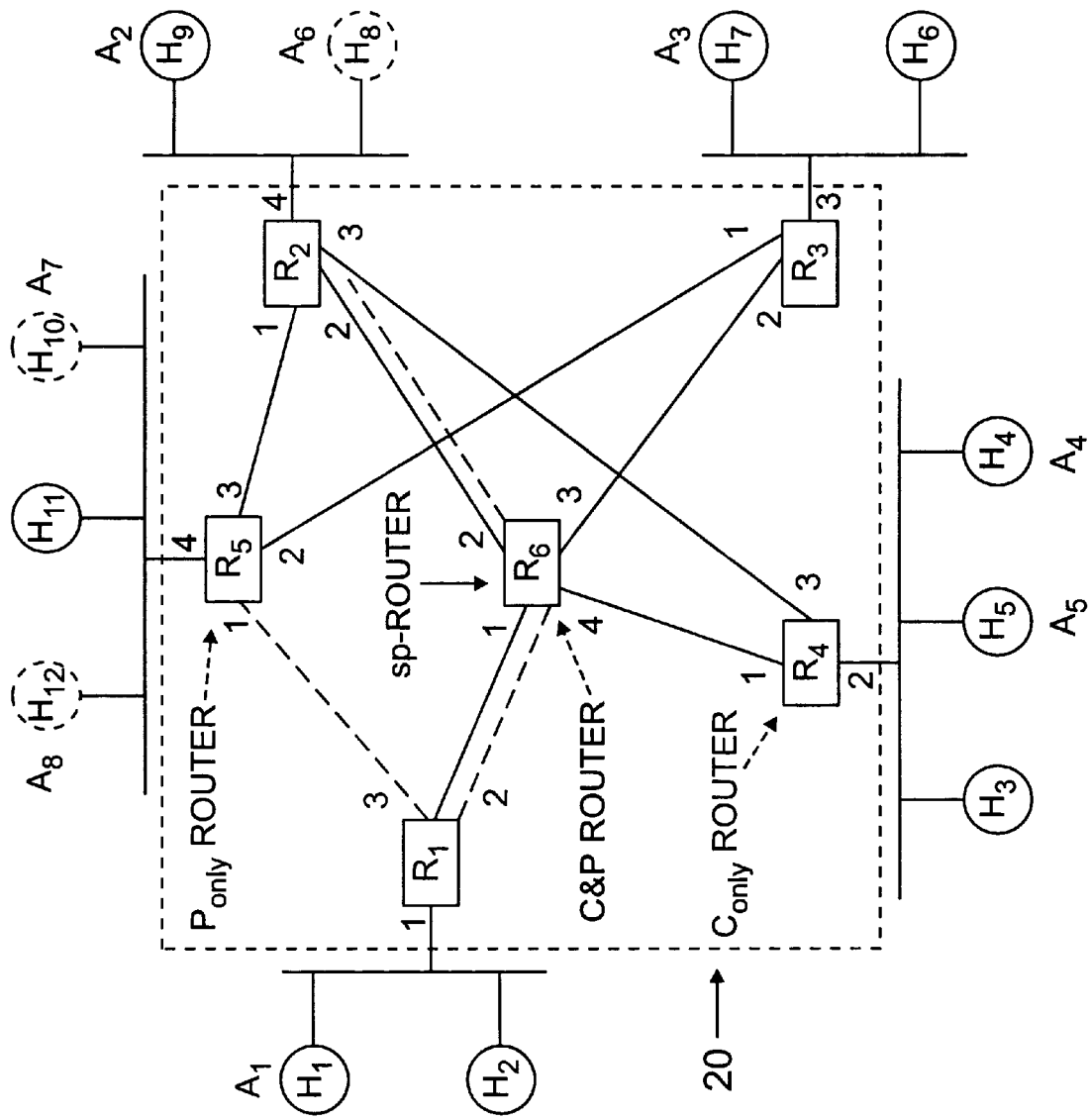
FIG. 8 shows signal flow through an exemplary MSBone illustrating a switch tree operation according to the present invention.

FIG. 8 shows an exemplary MSBone for illustrating a switch tree operation according to the present invention. In FIG. 8, application $A_1$ is the GA(G) for an ongoing discussion group G, and router $R_2$ is the GR(G). Tree(G) for group G is indicated by 21. For this example, a current multicast group includes applications $A_1$ through $A_5$, and a proposed multicast group includes applications $A_1$, $A_2$, and $A_6$ through $A_8$. In FIG. 8, routers on the current steiner tree 21 (solid line) are termed Current_G routers, and routers on the proposed Steiner tree 22 (dashed line) are termed Proposed_G routers. These two particular sets of routers may, of course, have a large intersection set. A Proposed_G router that is also a Current_G router might have a different io-set for the proposed Steiner tree. A router that is a Current_G router, but will not be a Proposed_G router, is referred to herein as a $C_{only}$ router. A router that is not a Current_G router, but will be a Proposed_G router, is referred to herein as a $P_{only}$ router. A router that is both a Current_G and a Proposed_G router is referred to herein a C&P router. In FIG. 8, routers $R_3$ and $R_4$ are $C_{only}$ routers, router $R_5$ is a $P_{only}$, and routers $R_1$, $R_2$, $R_6$ are C&P routers.

Message primitives that are implemented by the switch tree algorithm are: 1) Ioset_distribution message (from GR to Routers(G)); 2) Start_switch request message (from GR to Routers(G)); and 3) End_switch request message (from GR to Routers(G)). The switch tree operation proceeds as follows: GR(G) sends io-set information to all proposed routers using a GR_R_Ioset_distribution message via unicast or broadcast. $P_{only}$ routers create a new $R_{entry}$, whereas C&P routers maintain two entries, one reflecting the current io-set and the other reflecting the proposed io-set. For example, in FIG. 8, the io-set for router $R_5$, which is a $P_{only}$ router, is {1}. The io-set for router $R_4$, which is a $C_{only}$ router, is {1}. Router $R_6$, which is a C&P router, has two io-sets: {1, 2, 3, 4} for the current tree and {1, 2} for the proposed tree. GR(G) sends a GR_R_Start_switch message via multicast to routers associated with group G (routers $R_1$, $R_2$, $R_3$, $R_4$ and $R_6$). These routers will be both current and proposed routers. For reliability, the GR_R_Start_switch message is preferably sent via TCP. When the router set is large, a multicast TCP, such as Reliable Multicast Transport Protocol, is preferably used. On receiving a GR_R_Start_switch message for G over an incoming link, a $C_{only}$ and a $P_{only}$ router propagates the message as usual on all other io links.

The first C&P router receiving a data packet duplicates the packet and propagates the data packet on each of the two trees by checking the current $R_{entry}$ and the proposed $R_{entry}$ and acting on each $R_{entry}$. The C&P router also marks the data packet with an indication that it should be propagated on the current or the proposed tree. Subsequent C&P routers propagate the packet on the correct tree based on the data packet marking. Alternatively, data packets need not be identified and marked, but are simply forwarded using both the current and proposed $R_{entry}$'s. While, this alternative could potentially create some cycles in the graph of FIG. 7 during the switching time period, the packets propagated for this alternative soon are eliminated using the TTL value of the IP packets.

After a sufficient amount of time has elapsed so that all routers will have received the message, GR(G) sends an GR_R_End_switch message via multicast to routers of group G. For reliability, the GR_R_End_switch message may be repeated. On receiving a GR_R_End_switch message, a $C_{only}$ router deletes its Entry, and a C&P router deletes the Entry corresponding to the current Tree(G).

The period between the GR_R_Start switch and GR_R_End_switch messages is when multicasts are being carried by both the current Steiner tree and the proposed Steiner tree. Other algorithms are also possible for synchronizing the switching period more closely if accurate global clocks at each router are assumed to exist.

Applications may receive duplicate packets over the two multicast trees that require to be filtered out. For the many applications, such as vat, vic and wb, that use Real-time transport Protocol (RTP), duplicate packet filtering is done automatically. If the necessary filtering functionality is not available via RTP or other higher level protocol, the following duplicate packet filtering can be used over UDP.

Each sending source inserts sequence numbers into the packets on transmission. A sender never retransmits the same packet, nor does the transmitter maintain any other information except the next sequence number to use. A receiver maintains a buffer of received packets from each sender and the expected next sequence number from each particular sender. The receiver checks the buffer for the next sequence number expected. If the sequence number of a received packet is expected based on the buffer, then it is inserted into the buffer. All packets with sequence numbers lower than the expected sequence number are discarded. If the sequence number of a received packet is not the next expected sequence number, a timer is set to wait for additional packets. If the expected packet does not arrive by expiration of the timer or by when the buffer fills up, the expected sequence number is incremented by one and the buffer is checked again. The buffer is independently replenished with new packets. This approach can be further optimized by keeping some additional information and data structures. There are other details such, as initiation and termination to define a complete protocol. While this approach does not guarantee that packets will not be dropped, if a duplicate packet is delivered via two different paths, the packet that arrives earlier in time is picked up, thereby improving the response time, in addition to reliability.

In order to make the CSM protocol of the present invention tolerant to faults, a methodology, such as that discussed in Y. Huan et al., Software Implemented Fault Tolerance: Technologies and Experience, Proceedings of the 23rd International Symposium on Fault Tolerant Computing (FTCS-23), pp. 2–9, June 1993, and incorporated by reference herein, is practiced in which a set of software facilities are provided for helping an application raise its level of fault tolerance in terms of availability and consistency of the data. In the present invention, both the roles of the GA(G) and the GR(G) are critical. However, the following description illustrates only how GR(G) can be made fault tolerant. A similar approach can be used for increasing the fault tolerance capabilities of GA(G).

The approach to making GR(G) software fault tolerant is by replicating the functions of GR(G) at one or more backup nodes. All service requests are sent to the primary GR(G) node, which periodically checkpoints its state on the backup nodes. When the primary GR(G) node fails, the backup node takes over as the primary node. In this regard, Y. Huang et al., supra, provide three reusable components—watchd, libft, and nDFS—that are embedded in any application with minimal programming effort for providing the needed fault tolerance.

In the CSM protocol, the functions of GR(G) are summarized as follows: (1) compute a new CO Steiner tree for group G when necessary and inform all Routers(G) about the new io-sets; (2) maintain information about group G membership and associated Routers(G), as applications dynamically join and leave G; and (3) monitor traffic information related to G for helping determine a new tree. GR(G) is designated as a primary node and, according to the invention, the closest router to GR(G) in group G is designated a backup node or GRB(G) (backup GR).

Information on all multicast routers in the domain and the Steiner tree algorithms are automatically available to each msrouted since any router is capable of acting as a GR(G). The traffic information reaching GR(G) is data information flowing over the discussion group G and, thus, also automatically reaches GRB(G). Consequently, the membership information, which is the most relevant information, is periodically exchanged with GRB(G). Watchdog processes running on the primary node and the backup node watch for crashes or any hanging of the MSD server processes. Both GR(G) and GRB(G) periodically checkpoint the critical data that has been sent from GR(G) to GRB(G). If the backup node for G finds that the primary node has failed, the backup node takes over the function of the primary node by sending io-set information from the last checkpoint to all Routers (G), informs all Routers(G) that the backup node is the new GR(G), and updates information in the area MSD server. Finally, GRB(G) determines a new router to be the new backup node.

Details regarding the software modules providing the watchdog and critical data checkpointing functions can be found in Y. Huang et al, Software Fault Tolerance in Application Layer, Chapter 10 of the book Software Fault Tolerance, edited by M. Lyu and published by John Wiley & Sons, March 1995, and incorporated by reference herein. This approach can be used to cleanly and efficiently implement fault tolerance capabilities in the CSM protocol of the present invention. Furthermore, since the location of the backup node is based on a particular group G, the watchdog functions and associated overheads are spread out among the multicast routers and does not impede the scalability of the CSM protocol.

Figure 9:
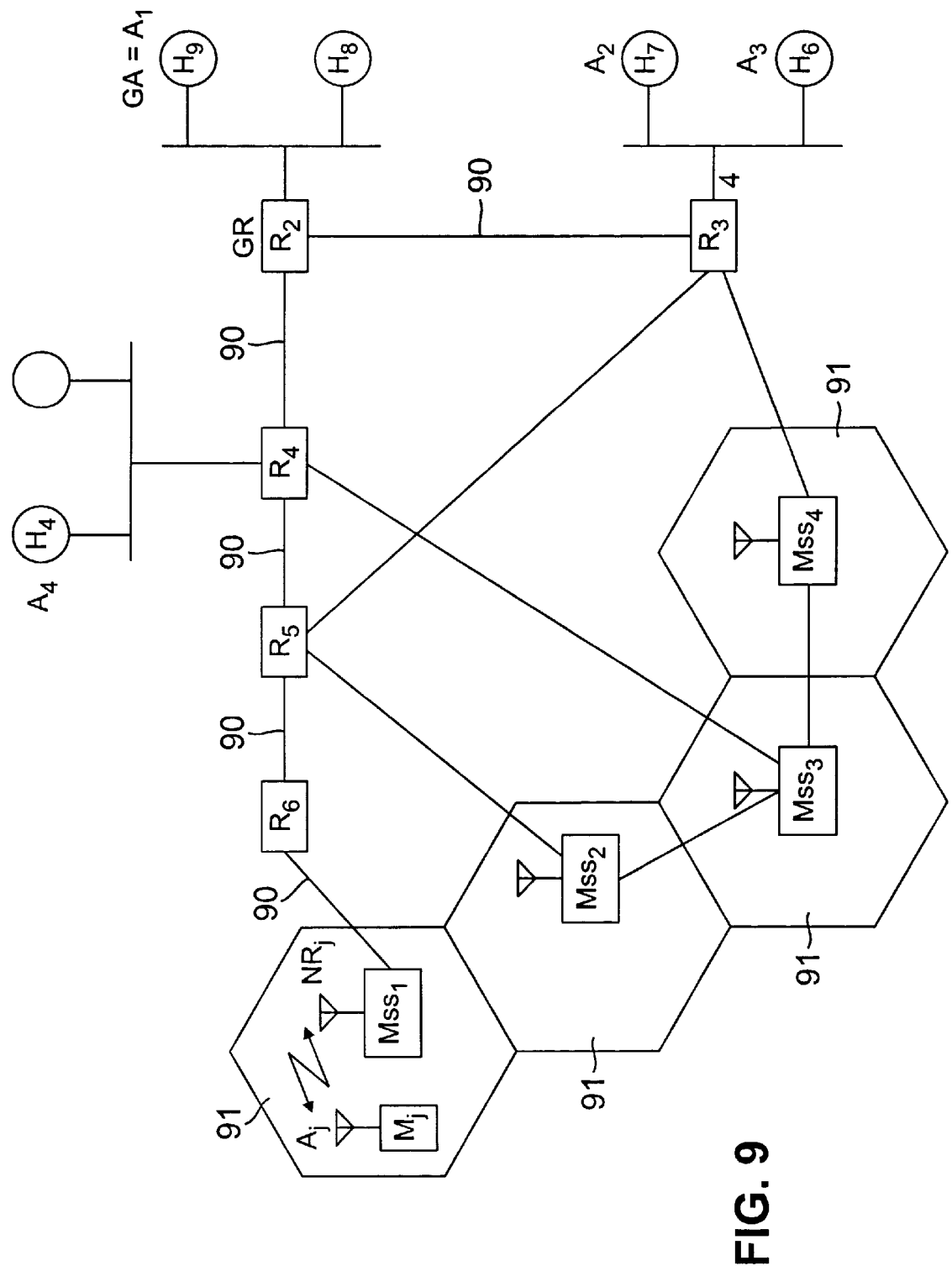
FIG. 9 is a schematic block diagram showing a plurality of mobile support stations connected to an exemplary fixed packet-switched MSBone network according to the present invention.

The CSM protocol can also be used with mobile applications, in which case the protocol of the present invention is referred to herein as mobile CSM (MCSM). A mobile application is defined herein to be an application that is running on a computer that is in a vehicle, or running on a portable PC that is being carried by an individual. Mobile applications are supported by a Mobile Support Station (MSS), which is a fixed entity that is connected to an MSBone network. FIG. 9 is a schematic block diagram showing a plurality of mobile support stations connected to an exemplary fixed packet-switched MSBone network 90. An MSS can be equated to a base station in a cellular architecture, for example. Each cell 91 includes with an MSS that operates as an access point to the MSBone for mobile stations within the cell. There is substantial overlapping between adjacent cells, such that a mobile application has adequate communications with more than one base station during transition from an old to a new base station, in accordance with well-known cellular telecommunications or personal communications network techniques.

Figure 10:
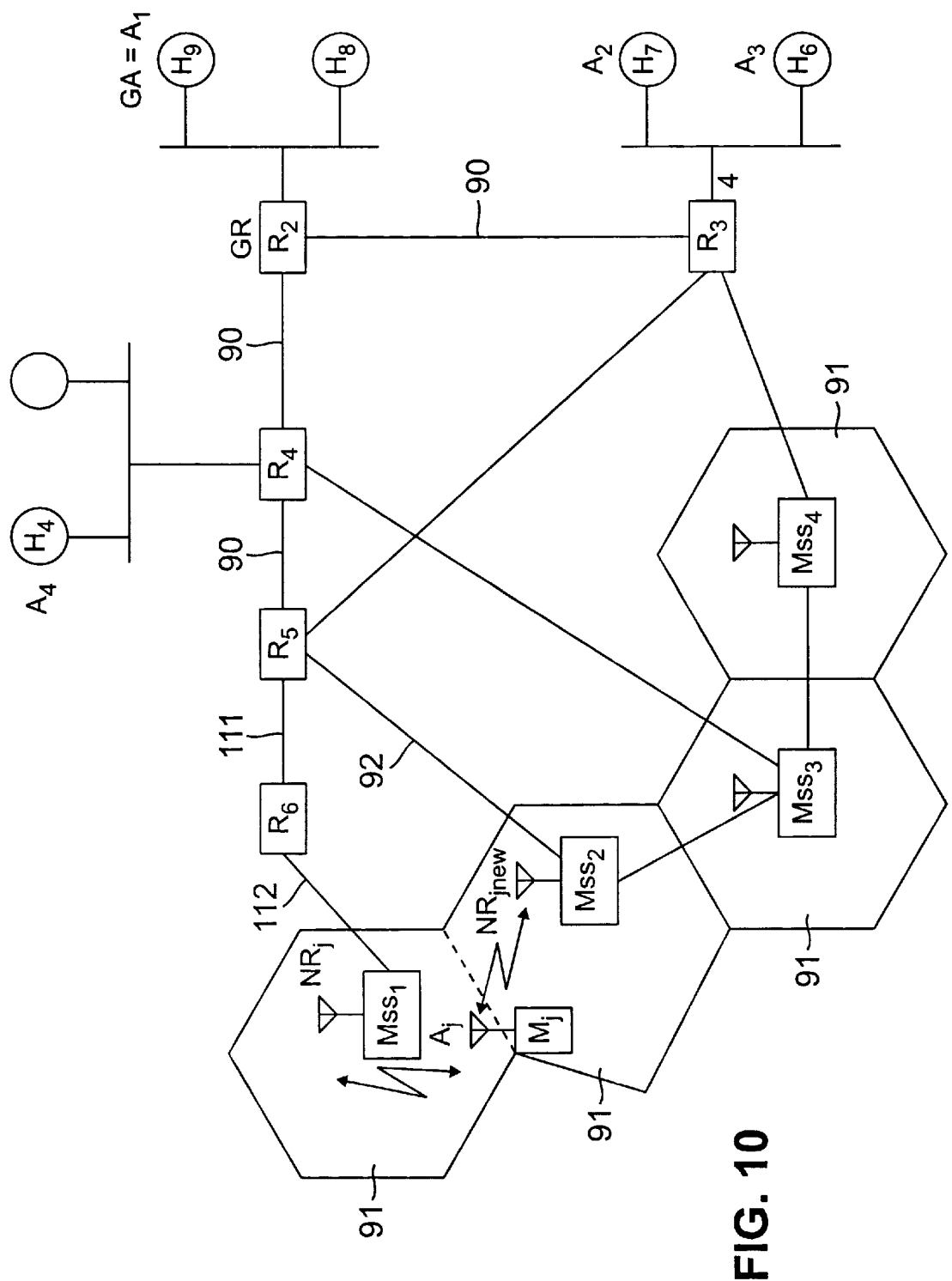
FIG. 10 shows an exemplary MSBone network during a handoff period when a mobile application transitions between mobile support stations according to the present invention.

In FIG. 9, $M_j$ is a mobile host that is running an application $A_j$. Mobile host $M_j$ accesses MSBone network 90 through a mobile support station $\text{MSS}_1$. As long as mobile host $M_j$ remains within the cell associated with $\text{MSS}_1$, $M_j$ interacts with $\text{MSS}_1$ in the same way that a stationary host $H_j$ interacts with its nearest router $NR_j$, as described in connection with the non-mobile conferencing MSBone configuration shown in FIG. 2. As mobile $M_j$ moves away from $\text{MSS}_1$, there is a handoff period when $M_j$ has an adequate communication link with both $\text{MSS}_1$ and $\text{MSS}_2$, a neighboring Mobile Support Station of $\text{MSS}_1$. FIG. 10 depicts MSBone network 90 of FIG. 9 during a handoff period as a mobile application transitions between $\text{MSS}_1$ and $\text{MSS}_2$.

Figure 11:
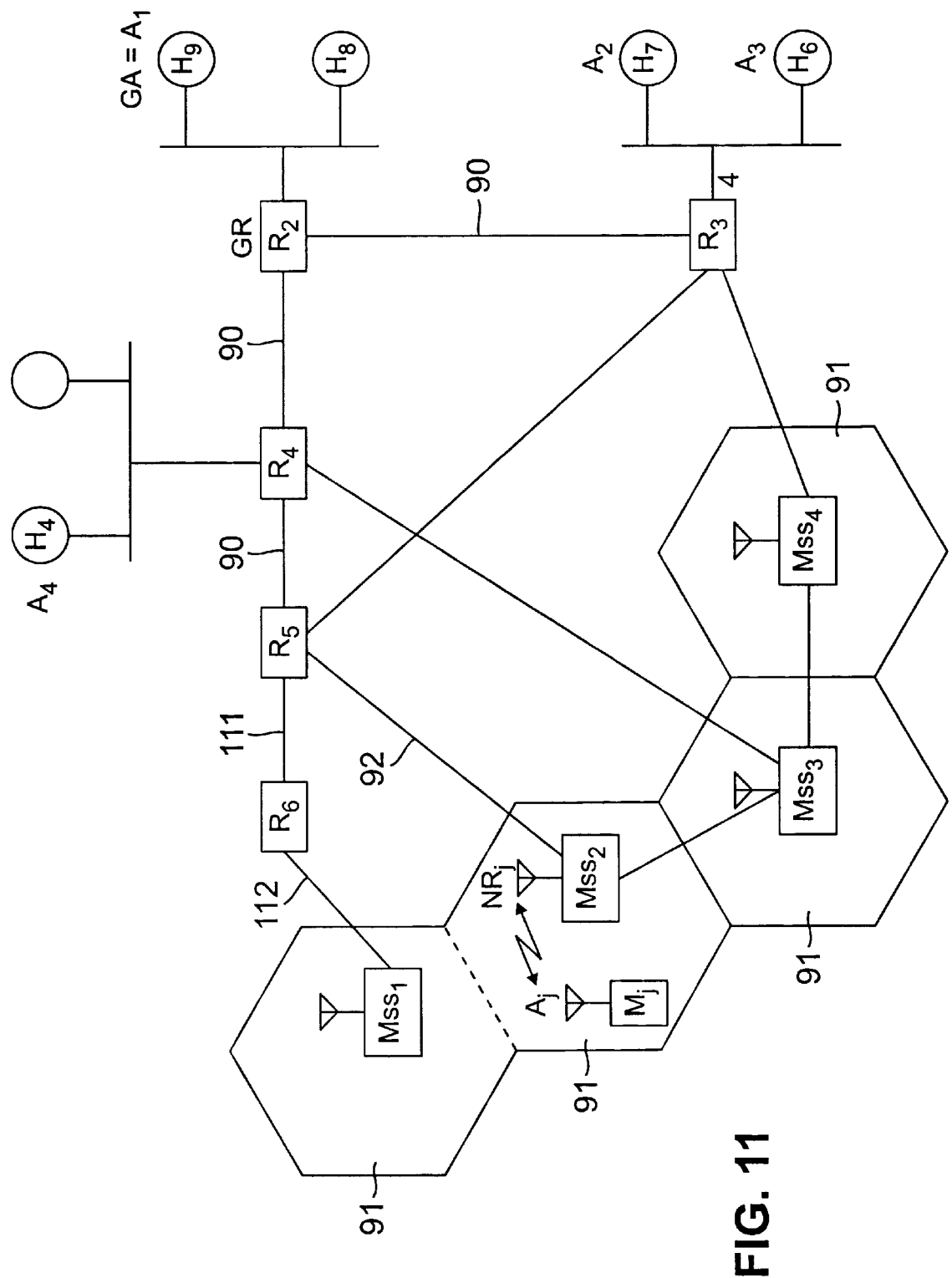
FIG. 11 shows an exemplary MSBone network after completion of a handoff period according to the present invention.

During the handoff period, $M_j$ sends a message to mobile support station $\text{MSS}_2$ requesting to join a multicast session that is in progress. Control information is propagated through the routers, resulting in a new branch 92 from $R_5$ to $\text{MSS}_2$ being added to the existing Steiner tree (FIG. 10). Thus, mobile application $M_j$ has two paths during the handoff period in which packets are sent to and received from the multicast session in progress: one path through $\text{MSS}_1$ and the other path through $\text{MSS}_2$. Consequently, data packets are reliably delivered to the mobile station $M_j$ using redundancy. After the mobile application $M_j$ moves away from $\text{MSS}_1$ and starts to communicate only through $\text{MSS}_2$, control information is propagated through the routers, resulting in the removal of the branch 111 formed between router $R_5$ to router $R_6$ and branch 112 formed between router $R_6$ and $\text{MSS}_1$, as shown in FIG. 11.

Thus, the multicast tree is dynamically altered as mobile hosts move in and out of cells. Specifically, the existing CO Steiner tree is augmented during handoff with new branches for providing redundancy, and after handoff is complete, unnecessary branches are removed from the multicast tree.

A handoff event can be triggered based on, for example, the relative strength of the signals received by the mobile application from nearby mobile support stations. For example, as a mobile application moves from one cell to another, the signal strength of the new MSS will eventually exceed a predetermined threshold, triggering a leave operation. The specific threshold can depend on a variety of factors, such as speed of the mobile application, the extent of overlap between adjacent cells, and the number of simultaneous connections supported by a MSS.

The advantages of using the MCSM protocol of the present invention for mobile applications are provided by two simple operations, namely a "leave" operation and a "join" operation. The symmetric architecture of the present invention, in which every conference participant is treated uniformly with no distinction between a sender and a receiver, simplifies the mobile aspects of the present invention. To support CMS operations, it is not necessary for a mobile application to acquire a temporary IP address each time it moves between cells. Nevertheless, the advantages of the mobile aspects of the present invention are more readily apparent when the concept of a temporary IP address is used for describing the invention.

Using a temporary IP address approach, the only message primitive needed for communicating between a mobile application and an MSS is an A_MSS-Get_ip-address request/reply/poll message. According to the invention, an Mss periodically broadcasts a message signal informing mobile applications nearing the Mss that MCSM services are supported by the Mss. The periodic broadcast signal can be viewed as a polling version of the primitive Get_ip_ address. The A_MSS$_{Get}$_ip_address request is used by a mobile application for requesting a temporary IP address when the mobile application determines that it should receive data messages through a new Mss.

Registration of a discussion group is done by a stationary initiator application that is connected the "wired" network. Consequently, a Gatekeeper Application (GA) and the Gatekeeper Router (GR) for an MCSM tree are identical to a CSM tree, and the same primitives as for CSM are used, making an MCSM tree robust without any significant loss in generality.

Steady state operation of MCSM is similar to steady operation of CSM in that each intermediate router, including every mobile support station, has an io-set and a delivery set that is used for forwarding packets to the participants of the conference session. At any instant of time, there may be several mobile applications in transition between cells. A mobile application uses its most recent temporary IP address for sending data packets, and data packets are received on a set of (temporary) IP addresses (redundancy). The receiving IP addresses are mapped into the io-set and the delivery set information at each intermediate router and at each Mss. Since a mobile application in transition may receive duplicate packets from multiple mobile support stations, the mobile application filters the duplicate packets, such as described herein.

The process of initially joining a discussion group or transitioning to a new cell is similar to that of CSM. That is, a mobile application $M_j$ first requests, for example, $Mss_1$ (FIG. 9) to provide $M_j$ with a temporary IP address by using the message primitive A_MSS_Get_ip_address request. When the Mss, after any authentication of $M_j$, determines that it will support application $M_j$, the Mss replies using an MSS_A_Get_ip_address reply, and effectively becomes the Nearest Router $NR_j$ for application $M_j$.

Once mobile application $M_j$ has received an IP address from the Mss, application $M_j$ issues an A_NR_Join dense request, similar to CSM (FIG. 4). The Mss (which is also the Nearest Router NRj for mobile application $M_j$) sends an R_R_Join_dense request "up the tree" to the next router for connecting to the current SO Steiner tree of the discussion group. The Mss acknowledges the join request of mobile application $M_j$ using an NR_A_join_dense reply message. Mobile application $M_j$ joins the discussion group G and proceeds to send messages to and receive messages from group members. If application $M_j$ is not joining the discussion group for the first time, application $M_j$ may be receiving the same message via two or more different paths, with duplicate messages being easily filtered out in a well-known manner.

When application $M_j$ desires to leave the discussion group via a particular Mss, application $M_j$ issues an A_NR_Leave_dense request message to the Mss, similar to CSM (FIG. 6). The Mss can acknowledge the leave request message using an NR_A_Leave_dense reply message, but in any event, drops the temporary IP address that had been assigned to application $M_j$. Alternatively, mobile application $M_j$ can transition to a new cell without sending a leave message to the Mss. In this situation, the Mss periodically polls mobile applications that are within its cell using an NR_A_Leave_dense poll message for determining whether they still wish to be receiving service. If an application does not reply to the polling message, the application is dropped by the Mss. A mobile application leaves a discussion group just as a stationary application leaves a discussion group in CSM. For MCSM, a mobile application leaves a cell only via its IP address that was assigned by the Mss of the cell. The mobile application may, of course, be connected to another Mss and be receiving and sending messages using another IP address.

The CSM protocol can be extended for operating in an environment having multiple domains. As already discussed, the CSM protocol operating in an intra-domain environment depends on the following components: (1) an area MSD server that maintains information about group G for new potential participants; (2) an application GA(G) that is central to admitting new participants; and (3) a GR(G) router that maintains and updates the CO Steiner tree for group G. Extending the CSM protocol to operate in an inter-domain environment is done basically by duplicating and coordinating the CSM protocol functions on an as needed basis in all domains having members of a group G.

Figure 12:
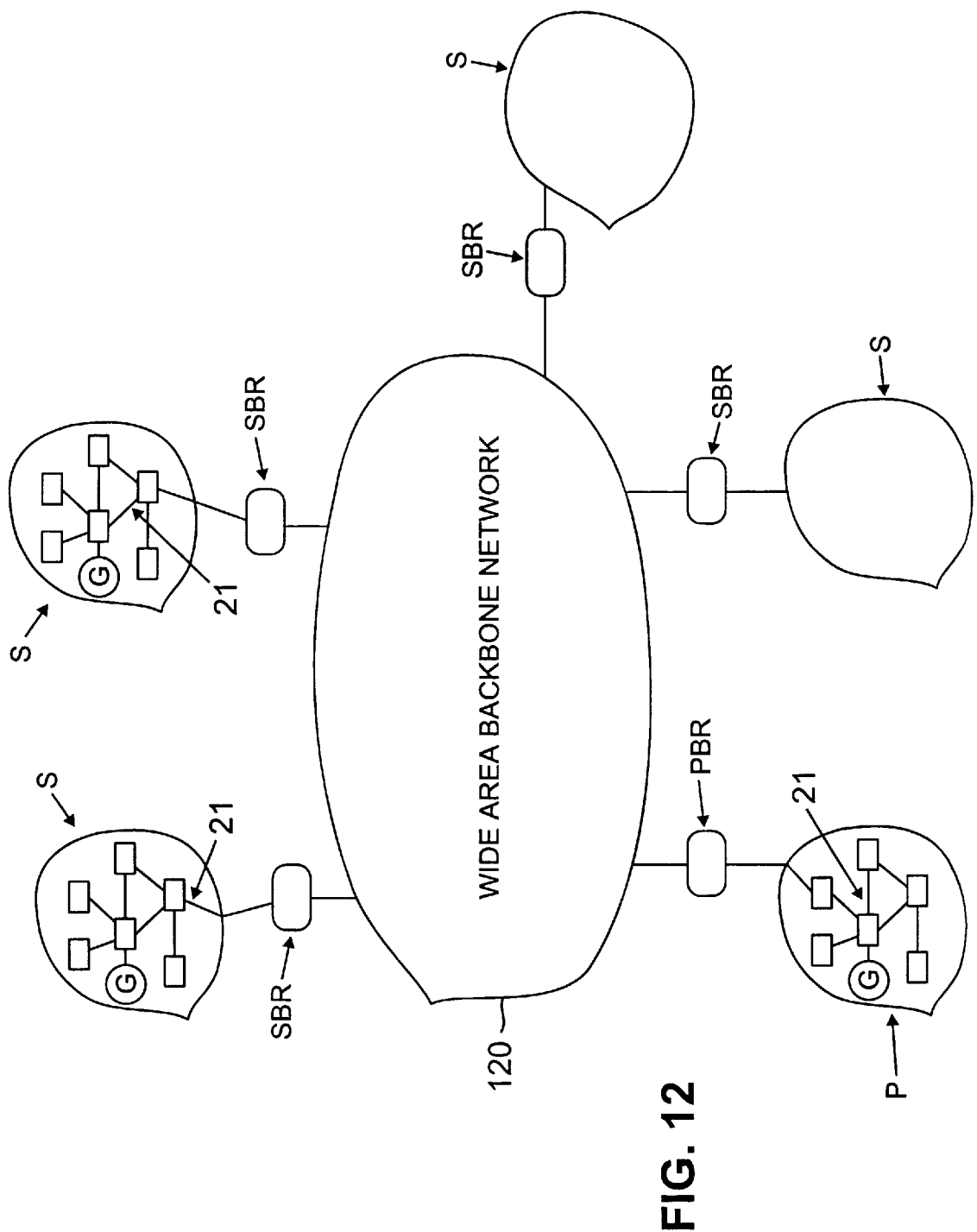
FIG. 12 shows a schematic block diagram of inter-domain configuration for the CSM protocol according to the present invention.

FIG. 12 shows a schematic block diagram of inter-domain configuration of the CSM protocol. In FIG. 12, a primary domain P and a plurality of secondary domains S are connected to a wide area backbone network 120. According to the invention, there is an area MSD server in each domain and the information about each multicast session is effectively duplicated on each area MSD server. Consider, for example, a multicast group having an initiator application and, consequently, a GA(G) and a GR(G) in domain P. Domain P is referred to as the primary domain, and the gatekeepers are the primary gatekeepers G. A secondary gatekeeper G' is set up in each domain S having a participant in the multicast group. Each secondary gatekeeper is responsible for maintaining the CO Steiner tree in each respective secondary domain S. Any new join or leave requests in a domain S is sent only to the secondary S gatekeepers G'. Thus, each domain independently maintains and updates its own local CO Steiner tree for the local domain routers and members of the multicast group.

In order to connect the CO Steiner trees in domains P and S, border routers for domains P and S are invoked. The P border router PBR is connected via a close-to-optimal path to the P domain CO Steiner tree, in the same manner as a new router is attached during a joining operation. The S domain border router SBR is similarly connected to the S domain CO Steiner tree. For simplicity, the two trees can be considered to be joined through a special double node consisting of the P domain and the S domain border routers, with the P and S border routers being effectively group multicast routers, just as are any of the other Routers(G) in their respective domains. Any group traffic from the P domain tree is forwarded by P border router PBR to S border router SBR. Any group traffic from the S domain tree is forwarded to the P border router. Thus, traffic from any tree is simply rebroadcast to the other tree. An analogy that aids in understanding this approach is to view the P and the S domain routers operating together as a promiscuous bridge.

A secondary gatekeeper in a domain S is setup only when a first application in the secondary domain S joining the multicast group is admitted. At that time, the closest router to the application becomes the S domain gatekeeper G. The same router can run an application that is the S domain gatekeeper G. The P border router PBR is connected to the CO Steiner tree in the P domain and the S border router SBR is connected to the new CO Steiner tree consisting only of the S domain gatekeeper G. If the number of members of the multicast group in the S domain drops to 0, then the secondary gatekeepers are flushed in that secondary domain and appropriate set leave operations relative to the border routers are performed. The secondary gatekeepers and the secondary MSD servers for the multicast group communicate with their corresponding primaries via unicast connections.

Only minor modifications to the EGP protocol are required for insuring that the border routers act as effective bridges. The major work of computing the CO Steiner trees and dynamically altering the structure of the discussion group is done by the gatekeepers of each domain. Thus, the computational effort is distributed across the respective domains further insuring scalability. Nevertheless, a problem can arise when a border router becomes a bottleneck by acting as a bridge for too many multicast sessions. Solutions include having more routers on the border or having a more effective hierarchy in the internet. The density of a single multicast session itself creates no problem because the border routers act as simple bridges, and connection requests go to the gatekeepers in each respective domain. For discussion groups that are an open type, there is not a need for the gatekeepers in the respective domains to communicate with the primary gatekeepers.

A specific example of an inter-domain configuration of the present invention is a plurality of local area networks (LANs) that are linked, such as to the Internet, to form a virtual wide area multicast network. A virtual network formed in this manner is referred to herein as the Multicast Steiner Backbone, or simply MSBone. Group admission and routing is handled according to the CSM protocol. The MSBone supports both CSM style and traditional multicast applications. Further, the MSBone can interoperate with an existing Mbone network.

When used in a virtual wide area network, the present invention requires two software components: (1) a user multicast session directory (umsd) and (2) the msrouted (multicast Steiner routing daemon). The umsd is a user interface to CSM and permits users to create (and delete) group sessions, to join and leave sessions, and to launch (multicast) applications, such as audio/video conferencing tools. The msrouted daemon implements the routing, communications, and GR functions of CSM.

Figure 13:
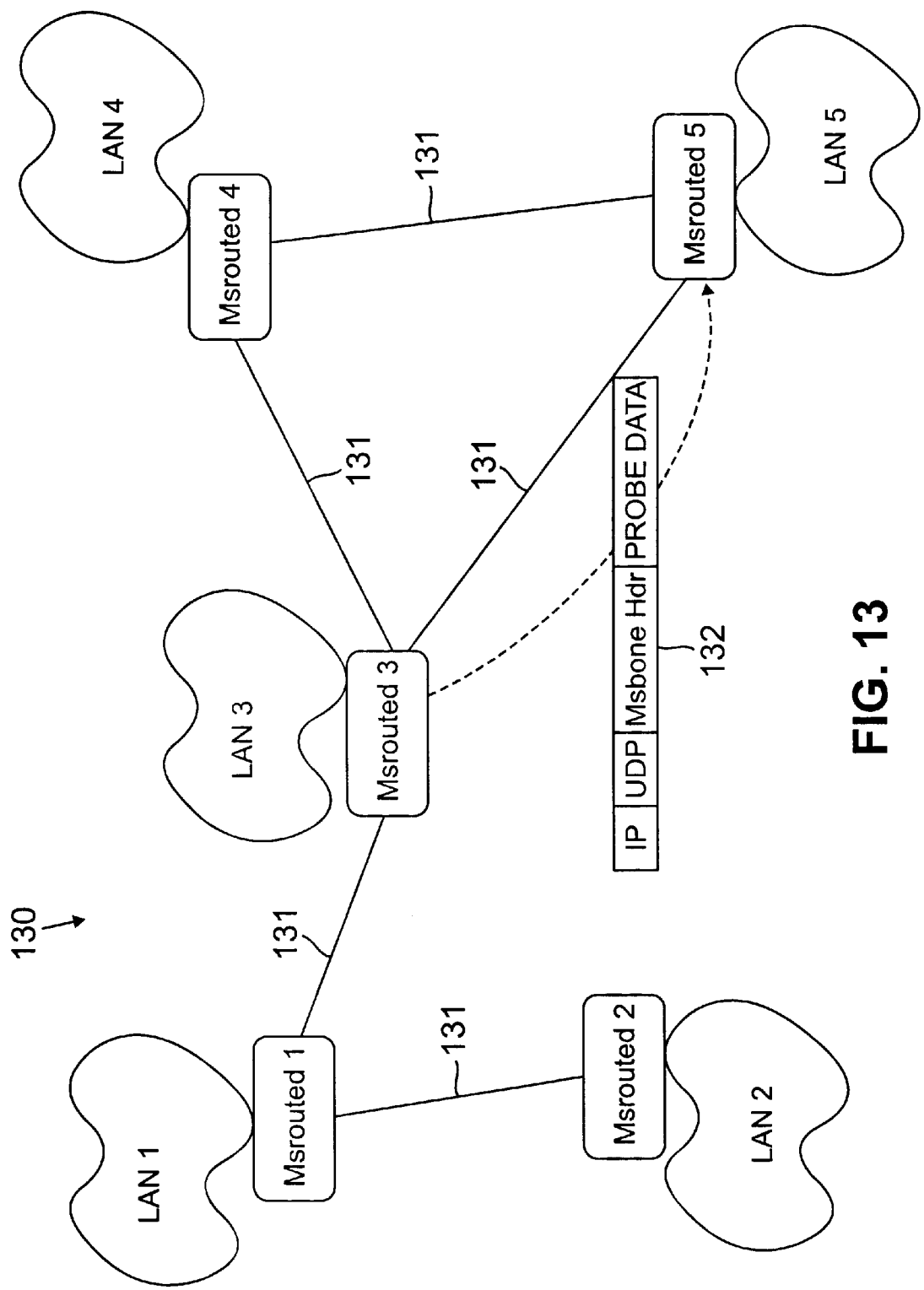
FIG. 13 shows a plurality of LANs are connected into a MSBone virtual multicast network according to the present invention.

To form a virtual wide area multicast network, each LAN selects one host to serve as a local "multicast router". The selected host runs the msrouted daemon, which is responsible for forwarding multicast packets to and from the LAN. Msrouted daemons exchange packets by encapsulating the packets within unicast packets. Two msrouted daemons that exchange packets by encapsulation are said to be connected by a tunnel. The collection of LANs, msrouted daemons and tunnels form the MSBone for the virtual wide area multicast network. For this configuration, there is a one-to-one correspondence between a CSM capable LAN and an msrouted daemon. For example, in FIG. 13, a plurality of LANs are connected into an MSBone virtual multicast network 130. Each LAN has a corresponding msrouted daemon. The LANs shown in FIG. 13 are linked together using a UDP tunnel. Neighboring msrouted daemons exchange probes and topology information along tunnels 131 using packets 132, thereby acquiring information that is used for maintaining a complete view of the topology of network 130 at each msrouted daemon.

Unlike other conventional multicast schemes, the CSM protocol of the present invention allows a multicast application to assert a great deal of influence over a discussion group via the Gatekeeper Application concept of the present invention. Applications designed to incorporate CSM concepts can utilize this additional influence for improved operation. However, a large base of existing applications do not incorporate CSM concepts. Nevertheless, the present invention supports both types of applications. According to the CSM protocol, a Gatekeeper Application (GA) controls admission to a group G and influences routing for the group. Typically, the application initiating the group acts as or initiates the GA that registers the group with an MSD in which the (unicast) address of the GA is advertised along with the group address.

Figure 14:
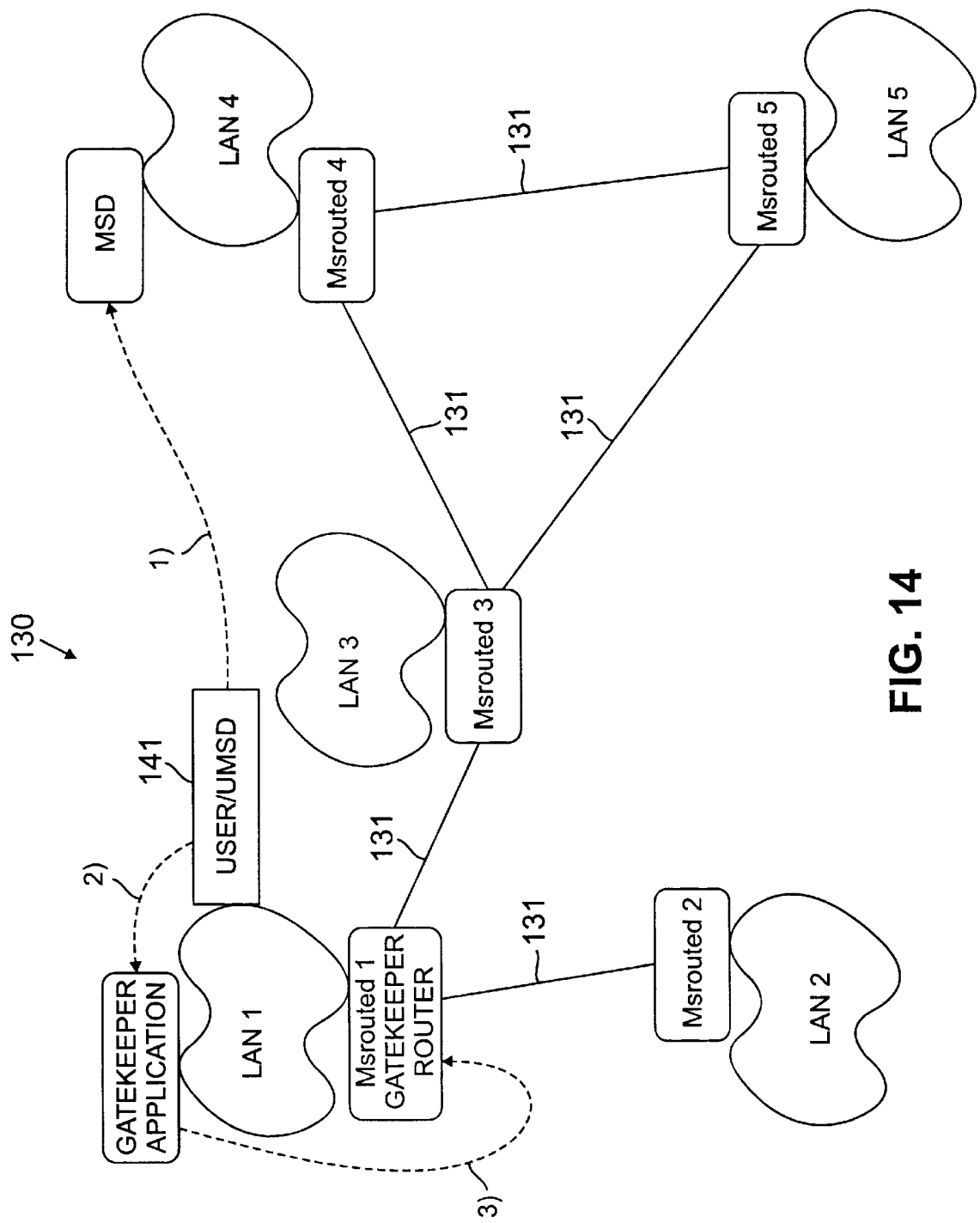
FIG. 14 shows an initial phase of a message flow for a user joining a group in a virtual multicast network according to the present invention.
Figure 15:
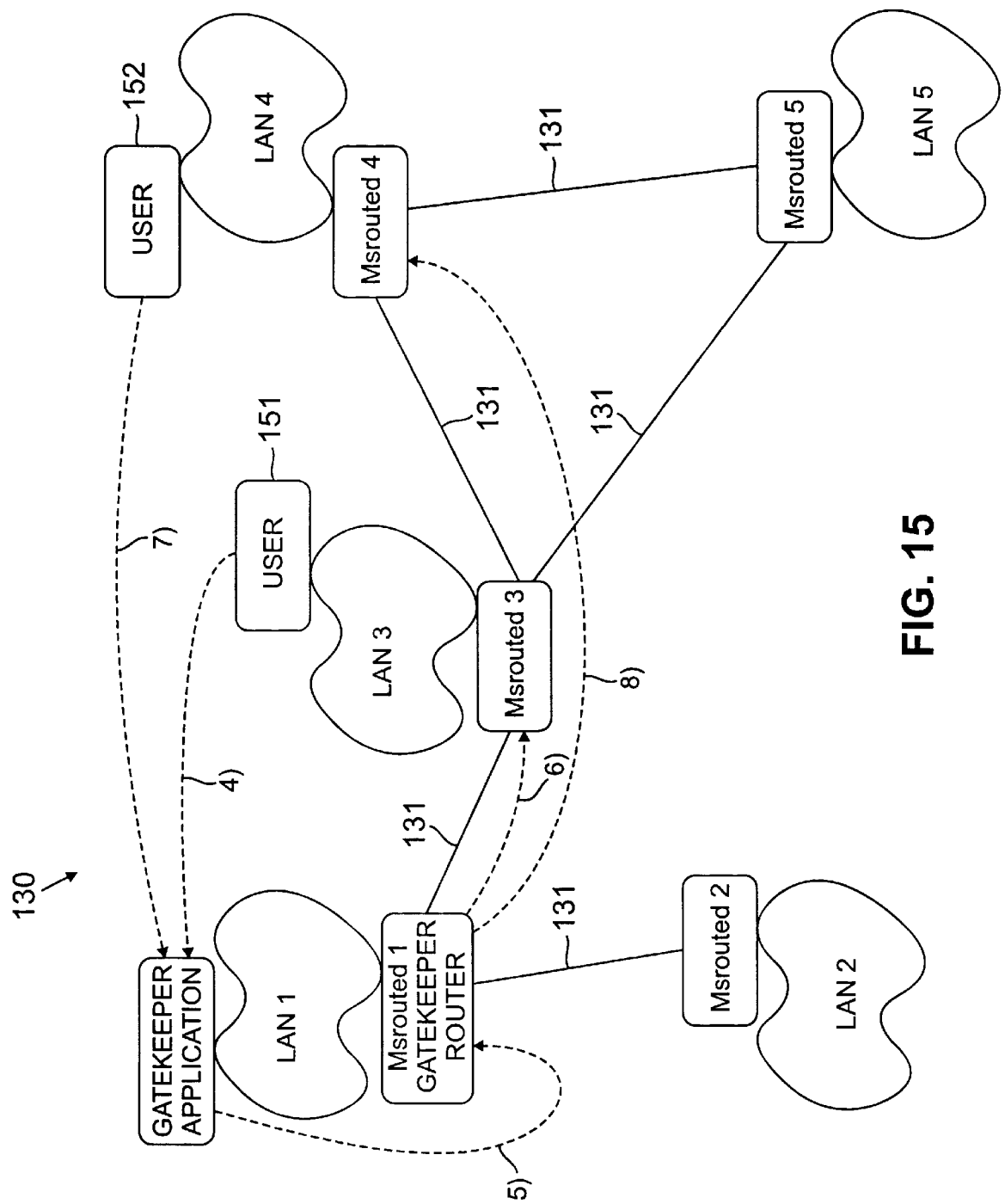
FIG. 15 shows a subsequent phase of a message flow for a user joining a group in a virtual multicast network.

FIGS. 14 and 15 show a message flow for a user joining a group in a virtual multicast network. In FIG. 14, a user 141 connected to LAN 1 initiates a new group by registering group G with an MSD (step 1). The user then launches the Gatekeeper Application GA (step 2). Gatekeeper Application GA notifies msrouted 1 (in LAN 1) that it will act as the Gatekeeper Router GR for the new group (step 3). In FIG. 15, a user 151 connected to a LAN 3 sends a request via TCP unicast to GA (msrouted 1) to become a new member of group G (step 4). If the request is approved, the GA informs Gatekeeper Router (msrouted 3) of LAN 3 so a route is established to new member 151 (step 5). Gatekeeper Router GR sends a route update table message to msrouted 3 adding tunnel 1–3 to group G (step 6). When a user 152 connected to LAN 4 becomes a member of group G (step 7), GA informs Gatekeeper Router GR of LAN 4 (step 5). Gatekeeper Router GR sends a route update table to msrouted 3 and msrouted 4 adding tunnel 3–4 to group G (steps 6 and 8).

While the gatekeeper concept adds to the complexity of creating and joining a group, it also provides substantial advantages. For example, the Gatekeeper Application can assert control over group membership because many multicast applications desire to know and perhaps restrict membership to a group. With the GA concept, membership control is managed cooperatively within the network and the multicast application can be assured that the routes are being computed based only on the valid members. The GA can also control when new members are allowed to join the group by delaying when the join is sent to the network. This allows a multicast application to enforce a rule that only allows new members to enter at a specified time. In addition to membership control, the GA can influence routing decisions. At any time the GA can instruct the network to recompute the routes or even switch to an entirely new algorithm for computing routes. In a multicast for two speakers, the GA could first optimize the routes for the initial speaker and later change the routes to optimize for the second speaker using AAR.

The GA functionally can be incorporated into a multicast application, be handled by a separate GA process, or be assigned to one of several default Gatekeeper Applications that run at well-known addresses throughout the network.

The Gatekeeper Application functionality can be directly incorporated into the multicast application code by a simple command line option that indicates that the application can be run in "gatekeeper mode". When the application is run at another location in non-gatekeeper mode, it preferably automatically generates a join request that is sent to the application operating in the "gatekeeper mode". This join procedure preferably occurs without knowledge of a user, or could generate pop-up windows prompting the user for information, such as a password, to complete the join operation. Some applications naturally implement the concept of a gatekeeper. For example, an application for conducting committee meeting may automatically designate one user as a chairperson. In such a situation, the chairperson's application should be allowed control over who participates in the meeting.

It may be desirable to locate the GA functions in a process or program that is separate from a multicast application. In such a situation, a group initiator starts the remotely located GA process. The initiating application is preferably configured so the GA process is automatically contacted, or a join process or wrapper might first be run that only starts the main multicast application after the join process has succeeded. The GA process can define its own packet formats and control scheme, or it can make use of MSBone GA control packet formats. The MSBone defines packet formats for an open, closed, and secure admission control scheme, as described herein. An open format allows any host to join, while a closed format restricts membership to a set of hosts. A secure format requires a password to join the group. The protocol of the present invention places no restrictions on how admission control is handled. The only requirement is that the GA and potential members have some agreed upon message format for joining the group.

Applications, such as vat, vc, w, and v, have become conventional network standards for multicast conferences. While these types of applications do not support the concept of a Gatekeeper Application, they can still be used with the CSM protocol of the present invention. Several default Gatekeeper Applications can run at well-known sites and can serve as the GA for any multicast application that does not provide its own GA functionality. This approach allows non-CSM applications to operate on the MSBone and benefit from MSBone admission control features. Preferably, an application launching program is used for first contacting a default GA, or for first creating the group through the default GA. Once the default GA has been contacted and a join operation is successful, the launching program is exited and the multicast application is run in a normal manner. When the group is created, the default GA can be instructed to provide an open, a closed or a secure admission control. Thus, tools, such as vat, can make use of the admission control feature of the MSBone.

Mbone users are accustomed to launching multicast applications via the sd or sdr tool. The MSBone of the present invention provides a User Multicast Session Director (umsd) (FIG. 14), which is a similar tool. With umsd, a user creates a group and joins a group in a fashion nearly identical to that of Mbone and sd. The user need not even be aware of the GA concept. The umsd tool of the present invention handles all the details relating to the GA and then starts the multicast application.

An application designer that wants to design a GA may be uncomfortable dealing with the network-level multicast issues. For example, an application designer is likely to be aware of admission control concepts, but multicast routing concepts are often not an area of expertise for the application designer. To overcome this obstacle, the MSBone of the present invention provides a network interface library so that, for example, adding a member to a group is as simple as calling a function called "addmember". Various routing algorithms are listed by number and are selected via a "recomputetree" function. Multicast routing can also be controlled by well-defined functions and option flags, much similar to the way a socket is controlled by simple flags. Consequently, an application designer need not understand the complexities associated with multicast routing problems and need only perform function calls from the multicast control library.

Since modifying existing routers is often not practical, MSBone uses host software for performing routing tasks. A LAN selects one particular host for running the msrouted daemon. The msrouted daemon for each LAN is configured for exchanging packets with a defined set of remote msrouted daemons. The sites of the remote msrouted daemons are defined in a configuration file that is read when the msrouted daemon is started. The interconnection of a plurality of msrouted daemons forms an MSBone (FIG. 13).

Figure 16:
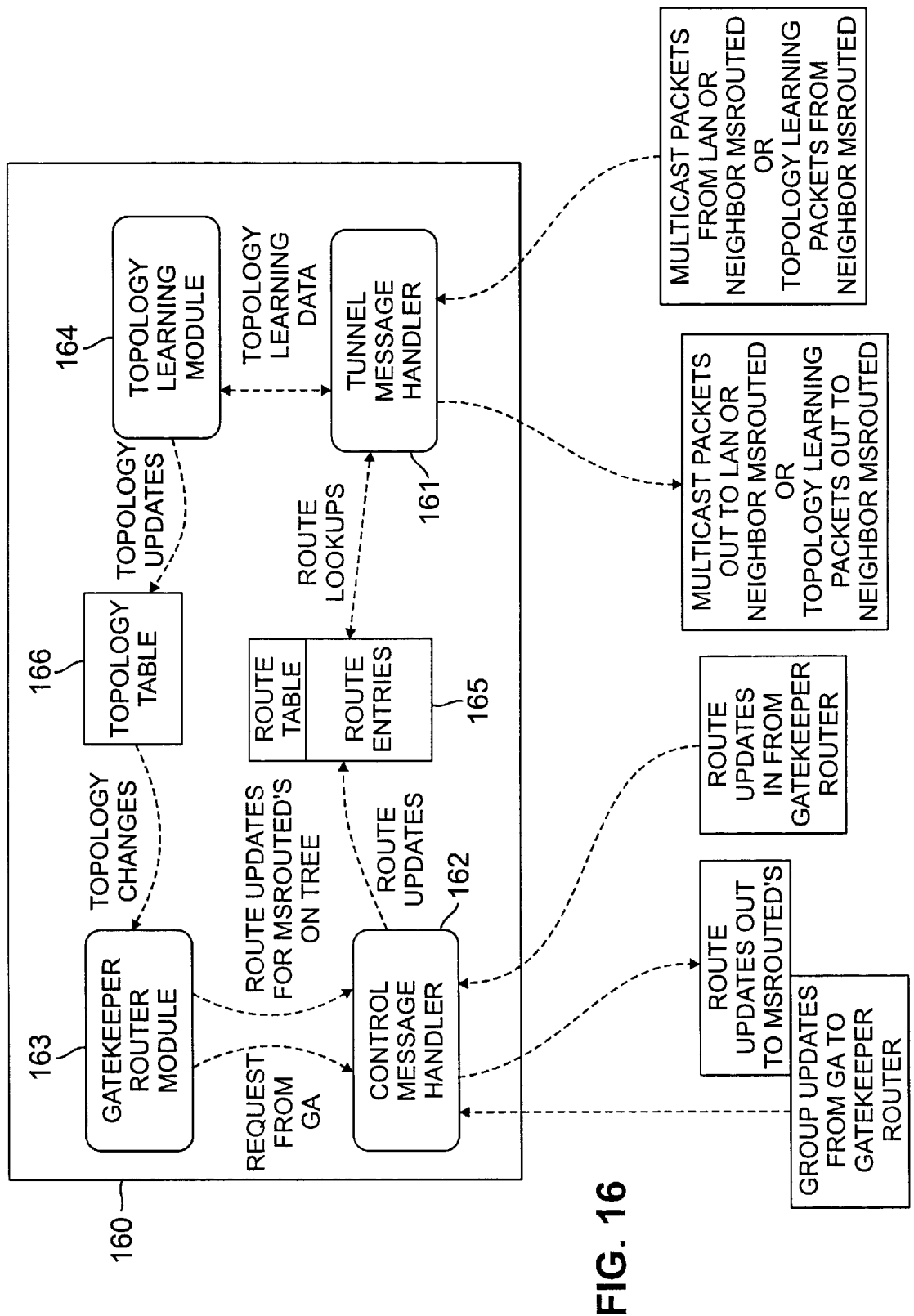
FIG. 16 shows a block diagram illustrating modules forming an msrouted daemon and signal flow associated with an msrouted daemon of the present invention.

Preferably, the msrouted daemon runs in a user-level space without requiring any special permissions. Preferably, better performance can be achieved by running with superuser privileges, but the msrouted daemon can be run without superuser privileges. Of course, this requires that msrouted tunnels encapsulate multicast packets in IP and UDP headers rather than just IP headers. Using only IP encapsulation, and thus also superuser privileges, is primarily a technicality and presents no fundamental changes to the CSM protocol of the present invention. FIG. 16 shows a block diagram illustrating modules forming an msrouted daemon and signal flow associated with an msrouted daemon of the present invention. FIG. 16 shows that an msrouted daemon 160 is logically divided into four modules: a Tunnel Message Handler (TMH) module 161; a Control Message Handler (CMH) module 162; a Gatekeeper Router Module (GRM) 163; and a Topology Learning Module (TLM) 164. FIG. 16 also shows that an msrouted daemon includes a route table 165 having route entries and a topology table 166.

Figure 17:
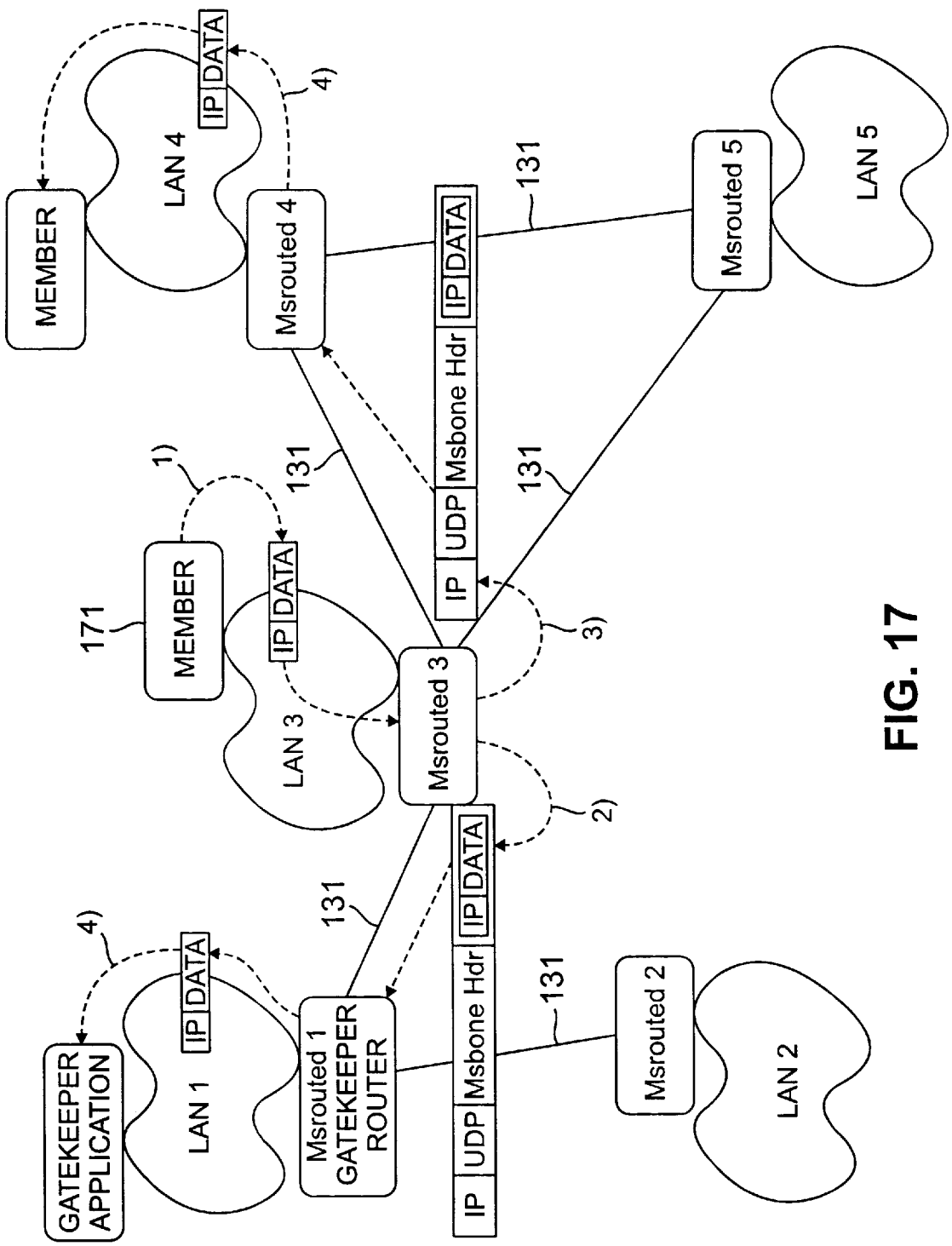
FIG. 17 shows a message flow diagram for when an msrouted daemon forwards an encapulated multicast packet to other msrouted daemons according to the present invention.

Tunnel Message Handler (TMH) module 161 focuses on reading and writing local multicast packets, and exchanging packets with other msrouted daemons. Once an application has joined a group via the GA and a route has been constructed, the application simply writes a multicast packet onto the LAN. The multicast packet is received by all local group members as well as by the msrouted daemon for the LAN. FIG. 17 shows a message flow diagram when an msrouted daemon receives a multicast packet from a local group member and forwards an encapulated multicast packet to other msrouted daemons. For example, a group member 171 connected to LAN 3 writes a multicast packet to LAN 3 (step 1). Msrouted daemon 3 receives the multicast packet and accesses the group's entry in route table 165 (FIG. 16) for determining which adjacent msrouted daemons should receive the packet. The multicast packet is encapsulated within an IP and UDP header and sent (unicast) to the appropriate adjacent msrouted daemons (steps 2 and 3). When an encapsulated packet arrives at an msrouted daemon, such as msrouted 1 and/or msrouted 4, the msrouted checks the multicast address of the encapsulated packet and forwards it to other appropriate (adjacent) msrouteds (step 4). In this particular case, neither msrouted 1 or msrouted 2 are shown forwarding the data packet to any other msrouted daemons. Since there is a local member to the group connected to each of LAN 1 and LAN 4, both msrouted 1 and msrouted 4 respectively decapsulates the packet and multicasts it locally on the local area network (step 4). Any local members receive this multicast as if they were on the same LAN as the original sender.

Control Message Handler (CMH) module 162 receives route update messages from Gatekeeper Router. In CSM terminology, these route updates messages are referred to as io-sets and are used for updating route table 165. An io-set is associated with a particular group and contains information used by an msrouted daemon identifying which neighboring msrouted daemons are part of a multicast routing tree for a group. Route entries may be explicitly cleared by receiving a NULL io-set for a group or, alternatively, the entry expires if a refresh message is not periodically received. The CMH is responsible for processing io-sets, maintaining the route table, and periodically terminating old entries.

Gatekeeper Router Module (GRM) 163 computes and distributes route entries (io-sets) for a group. Any msrouted daemon may operate as a GR and may serve many groups simultaneously, providing advantageous scalability features of the present invention. The gatekeeper router is preferably chosen to be the router that is nearest to the Gatekeeper Application, but can be any router in the MSBone. GRM 163 receives group membership updates from the GA and computes a route tree accordingly. Route tree computation can be implemented by an Application Assisted Routing (AAR) scheme, by several well-known Steiner tree algorithms, or by other well-known shared-tree algorithms. The Gatekeeper Application determines which tree calculation to use. GRM 163 is configured so that additional tree calculation algorithms can be easily added to the msrouted daemon. For example, addition of a new tree calculation algorithm can be done by merely adding a link to the object code for new algorithm.

Topology Learning Module (TLM) 164 maintains topology information because computation of a close-to-optimal Steiner tree (or other-type shared trees) is based on network topology information. This is done using periodic topology probe requests that are sent to neighboring msrouted daemons and with a topology learning algorithm implemented, such as that disclosed by Bertsekas et al., Data Networks, Prentice Hall, 1992, and incorporated by reference herein. The Bertsekas et al. algorithm is not fundamental to the present invention and other topology learning algorithms can be used, such as a RIP- or an OSPF-style algorithm. All that is required for the present invention is that TLM 164 provides up-to-date topology information to GRM 163 for computing CO Steiner trees. TLM 164 also notifies GRM 163 when the network topology changes so that GRM 163 can determine whether the trees for the sessions that are being maintained are still valid.

The MSBone of the present invention can interoperate with any other system, such as MBone. For example, an MSBone gateway can run on a LAN having a non-MSBone router, such as any LAN in the Mbone. The gateway acts as a proxy group member. When an MSBone host joins an Mbone group, the gateway also joins the same group. The non-MSBone routing algorithm delivers data packets to the MSBone gateway just as it would to any other MBone host. The MSBone gateway then routes the packets on the MSBone as if the MSBone gateway had generated the packets. Data packets arriving at the MSBone gateway from the MSBone network are multicast onto the non-MSBone LAN where the other (non-MSBone) multicast routers receive and distribute the packets as if the packets had been issued by any local group member. Similarly, MSBone applications can allow non-Mbone participants to join MSBone sessions by use of an MSBone gateway.

While the present invention has been described in connection with the illustrated embodiments, it will be appreciated and understood that modifications may be made without departing from the true spirit and scope of the invention.

What is claimed is:

1. A multicast routing system, comprising:
    a plurality of multicast routers, each multicast router being part of a telecommunications domain;
    a plurality of hosts, each host being connected to a multicast router, a selected host storing information relating to hosts that are members of a multicast group, the multicast router connected to the selected host determining a current close-to-optimal Steiner spanning tree formed from multicast routers that are connected to hosts that are members of the multicast group, members of the multicast group sending multicast information to other members of the multicast group over the current close-to-optimal Steiner spanning tree; and
    a multicast sessions directory running in the domain and accessible to possible participants wishing to join a multicast conferencing/discussion group session.

2. In a multicast routing system, comprising:
    a plurality of multicast routers, each multicast router being part of a public communications system domain; and
    a plurality of hosts, each host being connected to a multicast router, a selected host storing information relating to hosts that are members of a multicast group, the multicast router connected to the selected host determining a current close-to-optimal Steiner Spanning Tree formed from multicast routers that are connected to hosts that are members of the multicast group, members of the multicast group sending multicast information to other members of the multicast group over the close-to-optimal Steiner Spanning Tree; and
    wherein (i) the selected hosts sends information relating to member changes of the multicast group to the multicast router connected to the selected host, and (ii) the multicast router connected to the selected host periodically determines a new close-to-optimal Steiner Spanning Tree based on the information relating to the member changes.

3. The system according to claim 2, wherein when the new close-to-optimal Steiner spanning tree differs from the current close-to-optimal Steiner spanning tree by a predetermined difference, the multicast router connected to the selected host sends a switching operation begin message to each multicast router forming the current close-to-optimal Steiner tree, the switching operation begin message including information relating to multicast routers forming the new close-to-optimal Steiner spanning tree.

4. The system according to claim 3, wherein the multicast router connected to the selected host further sends a switching operation begin message to the multicast routers forming both the current close-to-optimal Steiner spanning tree and the new close-to-optimal Steiner spanning tree, and members of the multicast group send multicast information to other members of the multicast group simultaneously over the current close-to-optimal Steiner spanning tree and the new close-to-optimal Steiner spanning tree.

5. The system according to claim 4, wherein the multicast router connected to the selected host further sends a switching operation end message to the multicast routers forming both the current close-to-optimal Steiner spanning tree and the new close-to-optimal Steiner spanning tree, the switching operation end message causing multicast information to be sent over only the new close-to-optimal Steiner spanning tree.

6. The system according to claim 2, further comprising a multicast session directory server connected to the plurality of multicast routers, the multicast session directory server storing information relating to the multicast group.

7. The system according to claim 6, wherein the multicast session directory server further stores information related to a multicast IP address and port number of the selected host, a group type of the multicast group, and a nature of the multicast group.

8. The system according to claim 7, wherein the type of a multicast group is selected from the group consisting of an open group, a closed group, a sparse group and a dense group.

9. The system according to claim 2, wherein the multicast router connected to the selected host sends information relating to the current close-to-optimal Steiner spanning tree to the selected host, and the selected host stores the information relating to the current close-to-optimal Steiner spanning tree.

10. The system according to claim 2, wherein the selected host admits members to the multicast group.

11. The system according to claim 2, wherein the current close-to-optimal Steiner spanning tree includes a multicast router directly serving a host that is a member of the multicast group.

12. The system according to claim 11, wherein current the close-to-optimal Steiner spanning tree further includes at least one multicast router that is not associated with a host that is a member of the multicast group.

13. The system according to claim 12, wherein each multicast router runs a multicast Steiner routing application.

14. The system according to claim 13, wherein each multicast Steiner routing application is a daemon.

15. The system according to claim 2, wherein the multicast router connected to the selected host determines a new close-to-optimal Steiner spanning tree of multicast routers further based on expected traffic information of hosts that are members to the multicast group.

16. The system according to claim 15, wherein the expected traffic information includes information selected from the group consisting of an average traffic rate for each host, a peak traffic rate for each host, traffic receiving capability for each host and traffic generating capability for each host.

17. The system according to claim 2, wherein the multicast router connected to the selected host is a primary gatekeeper node, and another multicast router that forms the current close-to-optimal Steiner spanning tree is a backup gatekeeper node, the primary and backup gatekeeper nodes exchanging checkpoint messages.

18. The system according to claim 17, wherein when the backup gatekeeper node detects that the primary gatekeeper node fails, the backup gatekeeper node sends a message to the multicast routers forming the current close-to-optimal Steiner spanning tree that the backup gatekeeper node has become the primary gatekeeper node.

19. The system according to claim 2, further comprising a plurality of telecommunications domains, each domain including:

a plurality of multicast routers, a selected multicast router being connected to a selected multicast router in each other domain; and a plurality of hosts, each host being connected to a multicast router of the domain, a selected host storing information relating to hosts in the domain that are members of the multicast group, the multicast router connected to the selected host determining a current close-to-optimal Steiner spanning tree formed from multicast routers in the domain that are connected to hosts in the domain that are members of the multicast group and to the selected multicast router, members of the multicast group in the domain sending multicast information to other members of the multicast group over the current close-to-optimal Steiner spanning tree of the domain and current close-to-optimal Steiner spanning trees of each other domain.

20. The system according to claim 2, further comprising at least one mobile support station connected to the plurality of multicast routers, each mobile support station providing a communication link between a mobile application and the plurality of multicast routers.

21. The system according to claim 2, wherein the multicast router connected to the selected host periodically determines a new close-to-optimal Steiner spanning tree further based on the information provided by the selected host.

22. The system according to claim 2, wherein the multicast router connected to the selected host periodically determines a new close-to-optimal Steiner spanning tree further based on the information provided by the at least one host that is a member of the multicast group.

23. A method for determining a spanning tree for multicast group, comprising the steps of:

registering a multicast group at a multisession directory node;

admitting members to the multicast group;

computing a current close-to-optimal Steiner spanning tree, the current close-to-optimal Steiner spanning tree including a plurality multicast routers associated with the members of the multicast group; and running a multicast session directory server accessible to potential participants wishing to join a multicast conferencing/discussion group.

24. The method according to claim 23, further comprising the step of sending multicast information to members of the multicast group over the current close-to-optimal Steiner spanning tree.

25. A method for determining a spanning tree from multicast group, comprising the steps of:

registering a multicast group at a multi-session directory node;

admitting members to the multicast group;

computing a current close-to-optimal Steiner Spanning Tree, the current close-to-optimal Steiner Spanning Tree including a plurality of multicast routers associated with the members of a multicast group;

sending multicast information to members of the multicast group over the close-to-optimal Steiner Spanning Tree; and periodically recomputing a new close-to-optimal Steiner spanning tree based on changes in members admitted to the multicast group.

26. The method according to claim 25, further comprising the step of sending a switching operation begin message to each multicast router forming the current close-to-optimal Steiner tree when the new close-to-optimal Steiner spanning tree differs from the current close-to-optimal Steiner spanning tree by a predetermined difference, the switching operation begin message including information relating to multicast routers forming the new close-to-optimal Steiner spanning tree.

27. The method according to claim 26, further comprising the steps of:

sending a switching operation begin message to the multicast routers forming both the current close-to-optimal Steiner spanning tree and the new close-to-optimal Steiner spanning tree; and sending multicast information to members of the multicast group simultaneously over the current close-to-optimal Steiner spanning tree and the new close-to-optimal Steiner spanning tree.

28. The method according to claim 27, further comprising the steps of:

sending a switching operation end message to the multicast routers forming both the current close-to-optimal Steiner spanning tree and the new close-to-optimal Steiner spanning tree, and sending multicast information to members of the multicast group over only the new close-to-optimal Steiner spanning tree.

29. The method according to claim 25, further comprising the step of storing information relating to the multicast group at a multicast session directory server node.

30. The method according to claim 29, further comprising the step of storing information related to a multicast IP address and port number of the selected host, a group type of the multicast group, and a nature of the multicast group at the multicast session directory server node.

31. The method according to claim 30, wherein the type of a multicast group is selected from the group consisting of an open group, a closed group, a sparse group and a dense group.

32. The method according to claim 25, further comprising the steps of:

sending information relating to the current close-to-optimal Steiner spanning tree to a selected host, the selected host being associated with a member of the multicast group; and storing the information relating to the current close-to-optimal Steiner spanning tree at the selected host.

33. The method according to claim 25, wherein the step of determining new close-to-optimal Steiner spanning tree of multicast routers is further based on expected traffic information of members to the multicast group.

34. The method according to claim 33, wherein the expected traffic information includes information selected from the group consisting of an average traffic rate for each host, a peak traffic rate for each host, traffic receiving capability for each host and traffic generating capability for each host.

35. The method according to claim 25, wherein the step of computing the current close-to-optimal Steiner spanning tree is performed at a primary gatekeeper node, the method further comprising the steps of:

selecting a backup gatekeeper node; and exchanging checkpoint messages between the primary and backup gatekeeper nodes.

36. The method according to claim 35, further comprising the steps of:

detecting failure of the primary gatekeeper node at the backup gatekeeper node; and sending a message from the backup gatekeeper node to the multicast routers forming the current close-to-optimal Steiner spanning tree that the backup gatekeeper node is the primary gatekeeper node.

37. The method according to claim 25, wherein the changes in members admitted to the multicast group include location changes by mobile members with respect to plurality multicast routers associated with the members of the multicast group.

38. The method according to claim 25, further comprising the step of periodically recomputing a new close-to-optimal Steiner spanning tree based on information provided by at least one member of the multicast group.

* * * * *